(12) United States Patent
Leger et al.

(10) Patent No.: US 11,204,114 B2
(45) Date of Patent: Dec. 21, 2021

(54) REUSABLE PIPE FITTING SYSTEMS AND METHODS

(71) Applicant: TRINITY BAY EQUIPMENT HOLDINGS, LLC, Houston, TX (US)

(72) Inventors: John Paul Leger, Baytown, TX (US); Dale Brian Marietta, Katy, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/953,556

(22) Filed: Nov. 20, 2020

(65) Prior Publication Data

US 2021/0156499 A1    May 27, 2021

Related U.S. Application Data

(60) Provisional application No. 62/939,397, filed on Nov. 22, 2019.

(51) Int. Cl.
  *F16L 33/20*    (2006.01)
  *F16L 21/08*    (2006.01)

(52) U.S. Cl.
  CPC .................................. *F16L 21/08* (2013.01)

(58) Field of Classification Search
  CPC ......... F16L 21/08; F16L 33/01; F16L 33/225; F16L 33/223; F16L 33/224; F16L 33/2078; F16L 33/2071

(Continued)

(56) References Cited

U.S. PATENT DOCUMENTS

| 1,818,493 A | 8/1931 | McWane |
| 2,059,920 A | 11/1936 | Weatherhead, Jr. |

(Continued)

FOREIGN PATENT DOCUMENTS

| AU | 2014299014 | 1/2019 |
| AU | 2014363465 | 1/2019 |

(Continued)

OTHER PUBLICATIONS

United States Patent and Trademark Office; PCT International Search Report, issued in connection to application No. PCT/US20/61592; dated Feb. 10, 2021; 2 pages; US.

(Continued)

*Primary Examiner* — Aaron M Dunwoody
(74) *Attorney, Agent, or Firm* — Conrad J. Hsu

(57) ABSTRACT

Techniques for implementing and/or operating a pipeline system that includes a pipe segment and a reusable pipe fitting. The pipe segment includes tubing that defines a pipe bore and a fluid conduit within a tubing annulus of the pipe segment. The reusable pipe fitting includes a fitting body that defines a body bore and a pipe engaging assembly including a collapsible collar with teeth that extend radially inward. The collapsible collar contracts radially inward such that the collapsible collar engages the tubing of the pipe segment to facilitate securing the reusable pipe fitting to the pipe segment when the pipe engaging assembly is secured to the fitting body and expands radially outward such that the collapsible collar disengages from the tubing of the pipe segment to enable the reusable pipe fitting to be re-deployed at another pipe segment when the pipe engaging assembly is unsecured from the fitting body.

8 Claims, 9 Drawing Sheets

(58) Field of Classification Search
USPC .......... 285/222.1–222.5, 323, 324, 247–249
See application file for complete search history.

(56) References Cited

U.S. PATENT DOCUMENTS

| | | | |
|---|---|---|---|
| 2,460,653 A | 2/1949 | Raybould | |
| 2,552,077 A | 5/1951 | Williams et al. | |
| 2,711,913 A | 6/1955 | Jungblut | |
| 2,940,778 A | 6/1960 | Kaiser | |
| 3,038,745 A | 6/1962 | Cooke, Jr. | |
| 3,103,373 A | 9/1963 | Lennon et al. | |
| 3,158,388 A | 11/1964 | Marshall | |
| 3,189,370 A | 6/1965 | Marshall | |
| 3,576,334 A | 4/1971 | Hemens et al. | |
| 3,606,393 A | 9/1971 | Huntsinger et al. | |
| 3,726,319 A | 4/1973 | Patterson | |
| 3,834,742 A | 9/1974 | McPhillips | |
| 3,907,335 A | 9/1975 | Burge et al. | |
| 3,923,323 A | 12/1975 | Brogan | |
| 3,941,410 A | 3/1976 | Miyaoka | |
| 3,993,330 A | 11/1976 | Goransson | |
| 3,994,517 A | 11/1976 | Carmichael et al. | |
| 4,005,884 A | 2/1977 | Drori | |
| 4,008,911 A | 2/1977 | Kiyooka et al. | |
| 4,092,036 A | 5/1978 | Sato et al. | |
| 4,116,478 A | 9/1978 | Yamaji et al. | |
| 4,127,289 A | 11/1978 | Daspit | |
| 4,136,896 A | 1/1979 | Rodman et al. | |
| 4,212,487 A * | 7/1980 | Jones | F16L 33/225 285/243 |
| 4,303,263 A * | 12/1981 | Legris | F16L 33/24 285/249 |
| 4,608,454 A | 8/1986 | Lackinger | |
| 4,647,083 A | 3/1987 | Hashimoto | |
| 4,783,980 A | 11/1988 | Varga | |
| 4,790,379 A | 12/1988 | Vanderford, Jr. | |
| 4,799,714 A | 1/1989 | Collet | |
| 4,848,808 A | 7/1989 | Pannell et al. | |
| 4,867,489 A | 9/1989 | Patel | |
| 4,878,698 A | 11/1989 | Gilchrist | |
| 4,900,068 A | 2/1990 | Law | |
| 5,031,695 A | 7/1991 | Cain et al. | |
| 5,037,144 A | 8/1991 | Peting et al. | |
| 5,052,608 A | 10/1991 | McClure | |
| 5,071,175 A | 12/1991 | Kennedy, Jr. | |
| 5,074,599 A | 12/1991 | Wirbel et al. | |
| 5,205,356 A | 4/1993 | Bridges et al. | |
| 5,322,331 A | 6/1994 | Waldschmidt et al. | |
| 5,332,043 A | 7/1994 | Ferguson | |
| 5,398,980 A | 3/1995 | Hunter et al. | |
| 5,544,922 A | 8/1996 | Shumard et al. | |
| 5,613,714 A | 3/1997 | Toshima et al. | |
| 5,678,867 A | 10/1997 | Monaghan et al. | |
| 5,683,119 A | 11/1997 | Emmons et al. | |
| 5,738,385 A | 4/1998 | Homann et al. | |
| 5,803,513 A | 9/1998 | Richardson | |
| 6,019,137 A | 2/2000 | Secher et al. | |
| 6,161,880 A | 12/2000 | Peppel | |
| 6,173,993 B1 | 1/2001 | Shumard et al. | |
| 6,203,073 B1 | 3/2001 | Sato et al. | |
| 6,257,628 B1 | 7/2001 | Nijsen | |
| 6,273,142 B1 | 8/2001 | Braad | |
| 6,360,781 B1 | 3/2002 | Braad | |
| 6,467,819 B2 | 10/2002 | Seifert et al. | |
| 6,478,338 B1 | 11/2002 | Dalmolen et al. | |
| 6,488,084 B1 | 12/2002 | Borak, Jr. | |
| 6,502,866 B1 | 1/2003 | Hujisawa et al. | |
| 6,592,153 B1 | 7/2003 | Belcher | |
| 6,827,375 B2 | 12/2004 | Fraser | |
| 6,889,715 B2 | 5/2005 | Fraser et al. | |
| 6,904,939 B2 | 6/2005 | Jung et al. | |
| 6,923,477 B2 | 8/2005 | Buon et al. | |
| 6,945,570 B2 | 9/2005 | Jones | |
| 6,974,162 B2 | 12/2005 | Chelchowski et al. | |
| 7,055,551 B2 | 6/2006 | Fraser et al. | |
| 7,108,289 B1 | 9/2006 | Holmes, IV et al. | |
| 7,175,208 B2 | 2/2007 | Belcher | |
| 7,204,524 B2 | 4/2007 | Eccleston | |
| 7,207,606 B2 | 4/2007 | Owen et al. | |
| 7,243,954 B2 | 7/2007 | Toshima et al. | |
| 7,266,875 B2 | 9/2007 | Longacre et al. | |
| 7,341,288 B2 | 3/2008 | Lundstrom | |
| 7,469,936 B2 | 12/2008 | Norman | |
| 7,681,929 B1 | 3/2010 | Schlicht | |
| 7,748,100 B2 | 7/2010 | Kennedy, Jr. | |
| 7,918,486 B2 | 4/2011 | Preisendorfer | |
| 7,997,628 B1 | 8/2011 | Smith, Jr. et al. | |
| 8,096,585 B2 | 1/2012 | Vitel et al. | |
| 8,104,797 B2 | 1/2012 | Eccleston et al. | |
| 8,220,129 B2 | 7/2012 | Eccleston et al. | |
| 8,262,138 B2 | 9/2012 | Rischen et al. | |
| 8,439,404 B2 | 5/2013 | Anton et al. | |
| 8,573,654 B2 | 11/2013 | Kishi et al. | |
| 8,708,374 B1 | 4/2014 | Smith | |
| 8,960,276 B2 | 2/2015 | Lang et al. | |
| 9,127,525 B2 | 9/2015 | Nguyen | |
| 9,140,392 B2 | 9/2015 | Rivest | |
| 9,217,526 B2 | 12/2015 | Eccleston | |
| 9,334,990 B2 | 5/2016 | Nijsen | |
| 9,334,993 B2 | 5/2016 | Cloose et al. | |
| 9,534,719 B2 | 1/2017 | Eccleston et al. | |
| 9,574,690 B2 | 2/2017 | Clevelario et al. | |
| 9,643,226 B2 | 5/2017 | Thompson et al. | |
| 9,739,401 B1 | 8/2017 | Kennedy, Jr. | |
| 9,962,750 B2 | 5/2018 | Thompson et al. | |
| 9,964,244 B2 | 5/2018 | Maeda et al. | |
| 9,976,681 B2 | 5/2018 | Karabelas et al. | |
| 10,018,290 B2 | 7/2018 | Kishi et al. | |
| 10,036,497 B2 | 7/2018 | Box | |
| 10,113,677 B2 | 10/2018 | Bourget et al. | |
| 10,190,722 B2 | 1/2019 | Espinasse et al. | |
| 10,197,198 B2 | 2/2019 | Glejbol | |
| 10,226,823 B2 | 3/2019 | Karpachevskyy | |
| 10,226,892 B2 | 3/2019 | Kremers | |
| 10,234,068 B2 | 3/2019 | Varagnolo et al. | |
| 10,281,065 B2 | 5/2019 | Secher et al. | |
| 10,285,223 B2 | 5/2019 | Hatton et al. | |
| 10,288,207 B2 | 5/2019 | Littlestar et al. | |
| 10,364,925 B2 | 7/2019 | Roberts et al. | |
| 10,378,682 B2 | 8/2019 | Cloos et al. | |
| 10,408,795 B2 | 9/2019 | Nicolas et al. | |
| 10,415,731 B2 | 9/2019 | Boche et al. | |
| 10,429,267 B2 | 10/2019 | Grimsley | |
| 10,436,667 B2 | 10/2019 | Littlestar et al. | |
| 10,442,925 B2 | 10/2019 | Rong et al. | |
| 10,451,206 B2 | 10/2019 | Espinasse et al. | |
| 10,471,661 B2 | 11/2019 | Boczkowski et al. | |
| 10,480,054 B2 | 11/2019 | Valdez et al. | |
| 10,487,965 B2 | 11/2019 | Bouey et al. | |
| 10,494,519 B2 | 12/2019 | Wilson et al. | |
| 10,513,896 B2 | 12/2019 | Gudme et al. | |
| 10,527,198 B2 | 1/2020 | Nicolson et al. | |
| 10,544,889 B2 | 1/2020 | Bouey et al. | |
| 10,544,892 B2 | 1/2020 | Holst | |
| 2002/0117587 A1 | 8/2002 | Tenma et al. | |
| 2008/0231041 A1 | 9/2008 | Bucchi | |
| 2010/0133812 A1 | 6/2010 | Williams et al. | |
| 2011/0227337 A1 | 9/2011 | Kattler et al. | |
| 2012/0211975 A1 | 8/2012 | Campello et al. | |
| 2014/0246853 A1 | 9/2014 | Bucchi et al. | |
| 2015/0316187 A1 | 11/2015 | Matsubara | |
| 2016/0033066 A1 | 2/2016 | Patriarca | |
| 2016/0069494 A1 | 3/2016 | Paulo et al. | |
| 2016/0178106 A1 | 6/2016 | Glejbol | |
| 2016/0208969 A1 | 7/2016 | Bertoni et al. | |
| 2018/0128404 A1 | 5/2018 | Gray et al. | |
| 2018/0231149 A1 | 8/2018 | Glejbol et al. | |
| 2018/0231150 A1 | 8/2018 | Glejbol et al. | |
| 2018/0231151 A1 | 8/2018 | Straarup | |
| 2018/0231163 A1 | 8/2018 | Holst et al. | |
| 2018/0245725 A1 | 8/2018 | Glejbol et al. | |
| 2018/0274731 A1 | 9/2018 | Ethridge et al. | |
| 2019/0003921 A1 | 1/2019 | Nicholas | |
| 2019/0024830 A1 | 1/2019 | Glejbol | |

(56) References Cited

U.S. PATENT DOCUMENTS

| | | |
|---|---|---|
| 2019/0094101 A1 | 3/2019 | Spiegel et al. |
| 2019/0101233 A1 | 4/2019 | Hatton et al. |
| 2019/0126567 A1 | 5/2019 | Bournemann et al. |
| 2019/0137017 A1 | 5/2019 | Ishihara et al. |
| 2019/0154186 A1 | 5/2019 | Varagnolo et al. |
| 2019/0162334 A1 | 5/2019 | Westhoff et al. |
| 2019/0162335 A1 | 5/2019 | Yu et al. |
| 2019/0162336 A1 | 5/2019 | Andersen et al. |
| 2019/0186656 A1 | 6/2019 | Kozak et al. |
| 2019/0194440 A1 | 6/2019 | Rong et al. |
| 2019/0211951 A1 | 7/2019 | Clements |
| 2019/0217337 A1 | 7/2019 | Gujare et al. |
| 2019/0219199 A1 | 7/2019 | Snowdon et al. |
| 2019/0219473 A1 | 7/2019 | Littlestar et al. |
| 2019/0242501 A1 | 8/2019 | Bereczkne et al. |
| 2019/0257448 A1 | 8/2019 | Chalmers et al. |
| 2019/0285199 A1 | 9/2019 | Nicolson et al. |
| 2019/0309582 A1 | 10/2019 | Procida |
| 2019/0316711 A1 | 10/2019 | Shippen et al. |
| 2019/0338868 A1 | 11/2019 | Hjorth |
| 2019/0368967 A1 | 12/2019 | Grimsley |
| 2019/0391097 A1 | 12/2019 | Nicolas et al. |
| 2020/0011467 A1 | 1/2020 | Holst |
| 2020/0049280 A1 | 2/2020 | Wang et al. |
| 2020/0102658 A1 | 4/2020 | Wang et al. |

FOREIGN PATENT DOCUMENTS

| | | |
|---|---|---|
| AU | 2014310509 | 3/2019 |
| AU | 2015335367 | 10/2019 |
| AU | 2015345613 | 10/2019 |
| AU | 2019279941 | 1/2020 |
| BR | PI0810573 | 1/2019 |
| BR | 112019001414 | 2/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112019013850 | 7/2019 |
| BR | PI0720487 | 8/2019 |
| BR | 112012015257 | 9/2019 |
| BR | PI0909348 | 9/2019 |
| BR | 112019020051 | 10/2019 |
| BR | 112012020776 | 11/2019 |
| BR | 112019012614 | 11/2019 |
| BR | PI0808956 | 11/2019 |
| BR | 112013000428 | 1/2020 |
| BR | PI0924891 | 1/2020 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CN | 2531221 | 1/2003 |
| CN | 2627326 | 7/2004 |
| CN | 2627327 | 7/2004 |
| CN | 201126082 | 10/2008 |
| CN | 100504133 | 6/2009 |
| CN | 104266019 | 1/2015 |
| CN | 104500877 | 8/2016 |
| CN | 108105501 | 6/2018 |
| CN | 105351653 | 8/2018 |
| CN | 109153196 | 1/2019 |
| CN | 109153229 | 1/2019 |
| CN | 105626990 | 5/2019 |
| CN | 208845924 | 5/2019 |
| CN | 109958827 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 1252984 | 10/1967 |
| DE | 2540062 | 3/1977 |
| DE | 3221333 | 12/1983 |
| DE | 10040718 | 2/2002 |
| DE | 202004007321 | 8/2004 |
| DE | 10253090 | 8/2005 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EP | 541472 | 5/1993 |
| EP | 1108176 | 12/2005 |
| EP | 1843073 | 10/2007 |
| EP | 2000725 | 12/2008 |
| EP | 2213924 | 8/2010 |
| EP | 2045502 | 1/2012 |
| EP | 3001085 | 3/2016 |
| EP | 3001085 | 7/2017 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3314155 | 5/2019 |
| EP | 2519764 | 6/2019 |
| EP | 2572134 | 7/2019 |
| EP | 2661578 | 7/2019 |
| EP | 3507535 | 7/2019 |
| EP | 2576333 | 8/2019 |
| EP | 3014157 | 8/2019 |
| EP | 3059481 | 8/2019 |
| EP | 2588787 | 9/2019 |
| EP | 2870397 | 9/2019 |
| EP | 3093546 | 10/2019 |
| EP | 3350498 | 12/2019 |
| FR | 2430562 | 2/1980 |
| FR | 3068104 | 7/2019 |
| FR | 3077997 | 8/2019 |
| FR | 3074251 | 12/2019 |
| FR | 3076337 | 1/2020 |
| GB | 818819 | 8/1959 |
| GB | 1494323 | 12/1977 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| JP | 7103379 | 4/1995 |
| JP | 8166096 | 6/1996 |
| JP | 2000002385 | 1/2000 |
| JP | 3035736 | 4/2000 |
| JP | 3411382 | 5/2003 |
| JP | 3431052 | 7/2003 |
| JP | 3690932 | 8/2005 |
| JP | 2006077837 | 3/2006 |
| JP | 3894639 | 3/2007 |
| JP | 4086681 | 5/2008 |

(56) References Cited

FOREIGN PATENT DOCUMENTS

| | | |
|---|---|---|
| JP | 2009019666 | 1/2009 |
| JP | 4318696 | 8/2009 |
| JP | 4325770 | 9/2009 |
| JP | 4488635 | 6/2010 |
| JP | 4579194 | 11/2010 |
| JP | 4845635 | 12/2011 |
| JP | 4949061 | 6/2012 |
| JP | 5671112 | 2/2015 |
| JP | 2019152296 | 9/2019 |
| KR | 2008026749 | 3/2008 |
| KR | 864283 | 10/2008 |
| KR | 883799 | 2/2009 |
| KR | 1781608 | 9/2017 |
| NL | 2015946 | 6/2017 |
| RU | 2018113428 | 10/2019 |
| WO | 2007/029068 | 3/2007 |
| WO | 2007/042832 | 4/2007 |
| WO | 2008/117745 | 10/2008 |
| WO | 2010/047284 | 4/2010 |
| WO | 2011/099519 | 8/2011 |
| WO | 2015/177258 | 11/2015 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/137591 | 7/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |

OTHER PUBLICATIONS

United States Patent and Trademark Office; PCT Written Opinion of the International Searching Authority, issued in connection to application No. PCT/US20/61592; dated Feb. 10, 2021; 15 pages; US.

\* cited by examiner

REUSABLE PIPE FITTING SYSTEMS AND METHODS

CROSS-REFERENCE

The present disclosure claims priority to and benefit of U.S. Provisional Patent Application No. 62/939,397, entitled "NON-SWAGED, NON-POTTED END FITTINGS FOR FLEXIBLE PIPE AND METHODS OF INSTALLING SAME" and filed Nov. 22, 2019, which is incorporated herein by reference in its entirety for all purposes.

BACKGROUND

Flexible pipe can be utilized to transport production fluids, such as oil and/or gas and/or water, from one location to another. Flexible pipe is generally formed as an assembly of a portion of flexible pipe body and one or more end fittings. The end fittings may be used to connect segments of flexible pipe together or to connect them to terminal equipment, such as sub-sea structures or floating facilities. End fittings are important components for terminating and anchoring the pipe layers, sealing and venting gas in these environments.

Existing end fittings have certain deficiencies and disadvantages. For example, current end fittings used with offshore flexible pipe as described in API RP 17B ("17B Recommended Practice for Unbonded Flexible Pipe") with carcass are costly and have a long duration installation time. Improvements in this field of technology are therefore desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment and a reusable pipe fitting. The pipe segment includes tubing that defines a pipe bore and a fluid conduit within a tubing annulus of the pipe segment. The reusable pipe fitting includes a fitting body that defines a body bore in which pipe segment tubing is to be disposed and a pipe engaging assembly including a collapsible collar with one or more teeth that extend radially inward. The collapsible collar contracts radially inward such that the collapsible collar engages the tubing of the pipe segment to facilitate securing the reusable pipe fitting to the pipe segment when the pipe engaging assembly is secured to the fitting body and expands radially outward such that the collapsible collar disengages from the tubing of the pipe segment to enable the reusable pipe fitting to be re-deployed at another pipe segment in the pipeline system when the pipe engaging assembly is unsecured from the fitting body.

In another embodiment, a method of deploying a pipe fitting in a pipeline system includes disposing a pipe engaging assembly of the pipe fitting circumferentially around pipe segment tubing, in which the pipe engaging assembly includes a collapsible collar, disposing the pipe segment tubing within a body bore defined in a fitting body of the pipe fitting to facilitate sealing free space defined within an annulus of the pipe segment tubing at least in part by compressing a fitting seal disposed within the fitting body between the fitting body and the pipe segment tubing, and contracting the collapsible collar of the pipe engaging assembly radially inward to facilitate securing the pipe fitting to the pipe segment tubing at least in part by securing the pipe engaging assembly to the fitting body of the pipe fitting.

In another embodiment, a pipe fitting includes a fitting body that defines a body bore in which pipe segment tubing is to be secured and sealed, a fitting connector to be secured to the fitting body to enable the pipe fitting to be connected to another pipeline component, and a pipe engaging assembly to be secured to the fitting body. The pipe engaging assembly includes a collapsible collar having a conical outer surface, in which the collapsible collar is to be disposed circumferentially around the pipe segment tubing, and an activation collar having a conical inner surface that slides along the conical outer surface of the collapsible collar to enable the pipe fitting to be selectively secured to the pipe segment tubing at least in part by controlling position of the activation collar on the collapsible collar.

DETAILED DESCRIPTION

Figure 1:
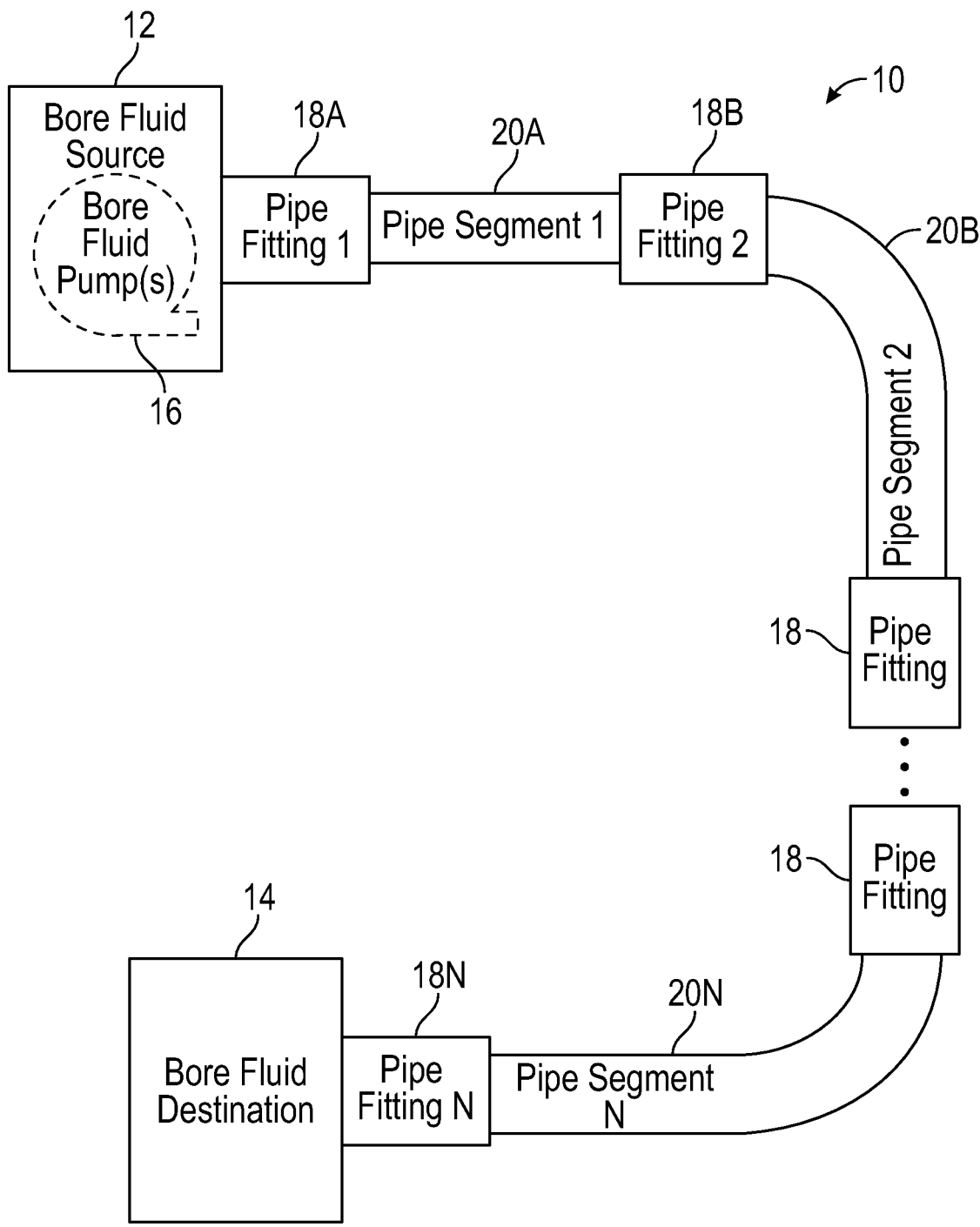
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple tubing layers. For example, the tubing of a pipe segment may include an internal pressure sheath (e.g., inner barrier) layer and an outer sheath (e.g., outer barrier) layer that are each implemented to run (e.g., span) the length of the pipe segment. In particular, the internal pressure sheath layer and the outer sheath layer may each be implemented as a continuous layer of solid material, such as plastic, that runs the length of the pipe segment.

In some instances, the tubing of a pipe segment may additionally include one or more intermediate layers implemented between its internal pressure sheath layer and its outer sheath layer and, thus, in a tubing annulus of the pipe segment. In particular, to facilitate improving its tensile strength and/or its hoop strength, in some instances, the intermediate layers of pipe segment tubing may include one or more reinforcement (e.g., pressure armor and/or tensile armor) layers, which each has one or more solid (e.g., reinforcement) strips that are implemented with material that has a higher tensile strength and/or a higher linear elasticity modulus (e.g., stiffness) than material that is used to implement the internal pressure sheath layer and/or the outer sheath layer of the pipe segment tubing. For example, a reinforcement strip may be implemented using metal, such as steel, while the internal pressure sheath layer and the outer sheath layer of the pipe segment tubing are implemented using plastic, such as high-density polyethylene (HDPE). Additionally or alternatively, the intermediate layers of pipe segment tubing may include one or more tape layers, one or more intermediate sheath layers, one or more anti-wear layers, one or more insulation layers, or any combination thereof.

Furthermore, in some instances, a pipe segment may be deployed in an elevated pressure environment, for example, underwater in a subsea application. To facilitate improving its collapse and/or crush resistance, in some instances, the tubing of the pipe segment may additionally include a carcass layer implemented within its internal pressure sheath layer. In other words, in such instances, the internal pressure sheath layer may be implemented around the carcass layer and, thus, the carcass layer may be the innermost layer of the pipe segment tubing.

In any case, as described above, the tubing of a pipe segment may generally be secured and sealed in a pipe fitting. In particular, in some instances, pipe segment tubing may be secured in a potted pipe fitting at least in part by anchoring one or more reinforcement strips of the pipe segment tubing in a potting cavity of the potted pipe fitting via cured (e.g., solidified and/or hardened) potting material, such as epoxy. In other instances, pipe segment tubing may be secured in a swaged pipe fitting at least in part by conformally deforming a fitting jacket of the swaged pipe fitting around the pipe segment tubing.

However, in some instances, the deformation of the fitting jacket of a swaged pipe fitting due to swaging may limit the ability of the swaged pipe fitting to be re-deployed at another pipe segment in the field, for example, due to deformation of the fitting jacket resulting in an inner surface diameter that is less than the default (e.g., natural, original, and/or uncompressed) outer surface diameter of the other pipe segment. Additionally, in some instances, cured potting material within the potting cavity of a potted pipe fitting that is used to secure the potted pipe fitting to a pipe segment may limit the ability of the potted pipe fitting to be re-deployed at another pipe segment in the field, for example, due to the cured potting material bonding to the potted pipe fitting and, thus, limiting the ability to subsequently flow fluid potting material into the potting cavity. In other words, at least in some instances, a potted pitting fitting or a swaged pipe fitting may effectively be a one-time-use pipe fitting and, thus, deploying such a pipe fitting in a pipeline system may potentially limit deployment efficiency of the pipeline system, for example, due to a change in deployment (e.g., layout and/or configuration) of the pipeline system resulting in an increased number of new pipe fittings being deployed therein.

Accordingly, to facilitate improving pipeline deployment efficiency, the present disclosure provides techniques for implementing and/or deploying a reusable pipe fitting, for example, which is re-deployable in the field without the use of hot tooling, such as welding and/or brazing. As will be described in more detail below, a reusable pipe fitting may generally include a fitting body, a fitting connector, and a pipe engaging assembly. In particular, the fitting body of a reusable pipe fitting may generally be implemented define a body (e.g., fitting) bore in which the tubing of a corresponding pipe segment is to be disposed and the fitting connector of the reusable pipe fitting may be secured to the fitting body to enable the reusable pipe fitting to be connected to another pipeline component, such as a bore fluid source, a bore fluid destination, or another pipe fitting.

Additionally, to enable reusability, the pipe engaging assembly of a reusable pipe fitting may generally include a collapsible collar, which is implemented to be selectively compressed (e.g., contracted) against the outer surface of pipe segment tubing. In particular, contracting the collapsible collar radially inward may cause its inner surface to engage the outer surface of pipe segment tubing and, thus, facilitate securing the reusable pipe fitting to the pipe segment tubing. On the other hand, expanding the collapsible collar radially outward may cause its outer surface to disengage from the outer surface of the pipe segment tubing and, thus, enable the reusable pipe fitting to be removed from the pipe segment tubing, for example, for re-deployment at other pipe segment tubing.

Thus, in some embodiments, a pipe engaging assembly of a reusable pipe fitting may be in its activated state when the inner surface diameter of its collapsible collar is less than or equal to (e.g., not greater than) a default (e.g., natural, original, and/or uncompressed) outer surface diameter of pipe segment tubing secured or to be secured therein. On the other hand, the pipe engaging assembly may be in a deactivated state when the inner surface diameter of its collapsible collar is greater than the default outer surface diameter of the pipe segment tubing.

To enable dynamically (e.g., adaptively) adjusting its inner surface diameter, the collapsible collar in a pipe engaging assembly may be implemented with multiple collar (e.g., "dog") segments such that open space is present between adjacent collar segments at least while the pipe engaging assembly is in its deactivated state. Thus, as the pipe engaging assembly is transitioned toward its activated state to facilitate securing the reusable pipe fitting to pipe segment tubing, adjacent collar segments in the collapsible collar may move into the open space therebetween. Additionally, to facilitate improving securement strength provided by a reusable pipe fitting, in some embodiments, the inner surface of the collapsible collar in its pipe engaging assembly may include one or more teeth (e.g., serrations).

Furthermore, in some embodiments, the collapsible collar in the pipe engaging assembly of a reusable pipe fitting may be disposed within a pipe engaging assembly cavity defined within the fitting body of the reusable pipe fitting. To facilitate controlling its activation state, in some such embodiments, the pipe engaging assembly may include multiple radial threaded fasteners (e.g., screws and/or bolts), which are each implemented to be secured through a radial fastener opening in the fitting body of the reusable pipe fitting such that its threaded end abuts the outer surface of a corresponding collar segment of the collapsible collar. Accordingly, in such embodiments, tightening a radial threaded fastener of the pipe engaging assembly may cause a corresponding collar segment of the collapsible collar to move radially inward and, thus, facilitate transitioning the pipe engaging assembly towards its activated state. On the other hand, in such embodiments, loosening a radial threaded fastener of the pipe engaging assembly may enable a corresponding collar segment of the collapsible collar to move radially outward and, thus, facilitate transitioning the pipe engaging assembly away from its activated state.

To facilitate controlling the activation state of its activation state, in other embodiments, the pipe engaging assembly in a reusable pipe fitting may additionally include an activation collar, which is implemented to be disposed circumferentially around at least a portion of its collapsible collar. In particular, in some such embodiments, the collapsible collar may have a male taper and, thus, a conical outer surface and a wedge-shaped axial cross-section profile. On the other hand, the activation collar may have a female taper (e.g., socket) and, thus, a conical inner surface and a wedge-shaped axial cross-section profile. More specifically, in such embodiments, the activation collar may be implemented external to the collapsible collar such that the conical inner surface of the activation collar can slide along the conical outer surface of the collapsible collar, for example, when external force is applied to activation collar.

In fact, due to the slopes of its collapsible collar and activation collar, the activation state of a pipe engaging assembly in a reusable pipe fitting may be controlled at least in part by controlling the position of the activation collar on the collapsible collar. For example, the pipe engaging assembly may be in a deactivated state when its activation collar is at a first (e.g., deactivated) position that results in the inner surface diameter of its collapsible collar being greater than the default outer surface diameter of the pipe segment tubing. However, moving (e.g., transitioning) the activation collar from the first position to a second (e.g., activated) position, which covers more of the collapsible collar, may contract (e.g., collapse and/or compress) the collapsible collar inwardly, thereby transitioning the pipe engaging assembly toward its activated state. In other words, when the pipe segment tubing is present therein, moving the activation collar from the first position to the second position may result in the inner surface (e.g., one or more teeth) of the collapsible collar engaging (e.g., contacting) the outer surface of the pipe segment tubing, thereby increasing the resistance (e.g., force) the pipe engaging assembly exerts against movement of the pipe segment tubing. On the other hand, moving the activation collar form the second position to the first position may result in the inner surface of the collapsible collar disengaging from the outer surface of the pipe segment tubing, thereby reducing the resistance the pipe engaging assembly exerts against movement of the pipe segment tubing, for example, to enable the reusable pipe fitting to be removed from the pipe segment tubing and re-deployed at different pipe segment tubing.

To facilitate controlling the position of an activation collar on a corresponding collapsible collar, in some embodiments, the fitting body of a reusable pipe fitting may include threading. In particular, in some such embodiments, the fitting body may be implemented as a threaded inner fitting body, which has threading implemented along its outer surface, and a threaded outer fitting body, which has corresponding threading implemented along its inner surface. Thus, after an activation collar is secured to the threaded outer fitting body, tightening the threaded outer fitting body on the threaded inner fitting body may pull more of the activation collar onto the collapsible collar and, thus, contract the collapsible collar radially inward. On the other hand, loosening the threaded outer fitting body from the threaded fitting body may push more of the activation collar off of the collapsible collar, thereby enabling the collapsible collar to expand radially outward.

Alternatively, in other such embodiment, the fitting body of a reusable pipe fitting may include an axial fastener opening, which is implemented to be aligned with a corresponding axial fastener opening in the activation collar of the reusable pipe fitting. Accordingly, in such embodiments, tightening an axial threaded fastener, such as a bolt or a screw, in the axial fastener openings may cause the fitting body and the activation collar to move toward one another and, thus, to cover more of the collapsible collar, thereby causing the collapsible collar to contract radially inward. On the other hand, in such embodiments, loosening the axial threaded fastener from the axial fastener openings may cause the fitting body and the activation collar to move away from one another and, thus, to cover less of the collapsible collar, thereby enabling the collapsible collar to expand radially outward.

In any case, to facilitate anchoring the carcass layer of a pipe segment therein, in some embodiments, a reusable pipe fitting may additionally include a carcass (e.g., insulator) ring, which is implemented to be secured to the carcass layer. For example, in some embodiments, the reusable pipe fitting may include an exterior carcass ring, which is implemented be secured to an outer surface of the carcass layer. In particular, in some such embodiments, the exterior carcass ring may be implemented using spring metal such that the exterior carcass ring is inwardly biased and disposed within a carcass ring cavity, which is defined circumferentially around a corresponding body bore of the reusable pipe fitting. Thus, in such embodiments, the reusable pipe fitting may be deployed at a pipe segment at least in part by stabbing (e.g., inserting) the tubing of the pipe segment into the body bore of the reusable pipe fitting such that contours on the outer surface of the carcass layer in the pipe segment cause the exterior carcass ring to expands around and grab onto the outer surface of the carcass layer.

However, in other embodiments, a reusable pipe fitting may include an interior carcass ring, which is implemented to be secured to the inner surface of the carcass layer of a pipe segment such that the interior carcass ring abuts the fitting body of the reusable pipe fitting. In particular, to facilitate providing reusability, in some such embodiments, the interior carcass ring may be secured to the inner surface of the carcass layer via one or more threaded fasteners, such as a bolt or a screw. In this manner, as will be described in more detail below, the present disclosure provides techniques for implementing and/or deploying a reusable pipe fitting, which, at least in some instances, may facilitate improving deployment efficiency of a pipeline system, for example, due to reuse and/or re-deployment of the pipe fitting enabling a reduction in the number of new pipe fittings deployed therein.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different tubing layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more annular gaps) devoid of solid material in its annulus. In fact, in some embodiments, the free space in the tubing annulus of a pipe segment 20 may run (e.g., span) the length of the pipe segment 20 and, thus, define (e.g., enclose) one or more fluid conduits in the annulus of the tubing, which are separate from the pipe bore. In other words, in such embodiments, fluid may flow through a pipe segment 20 via its pipe bore, a fluid conduit defined within its tubing annulus, or both.

Figure 2:
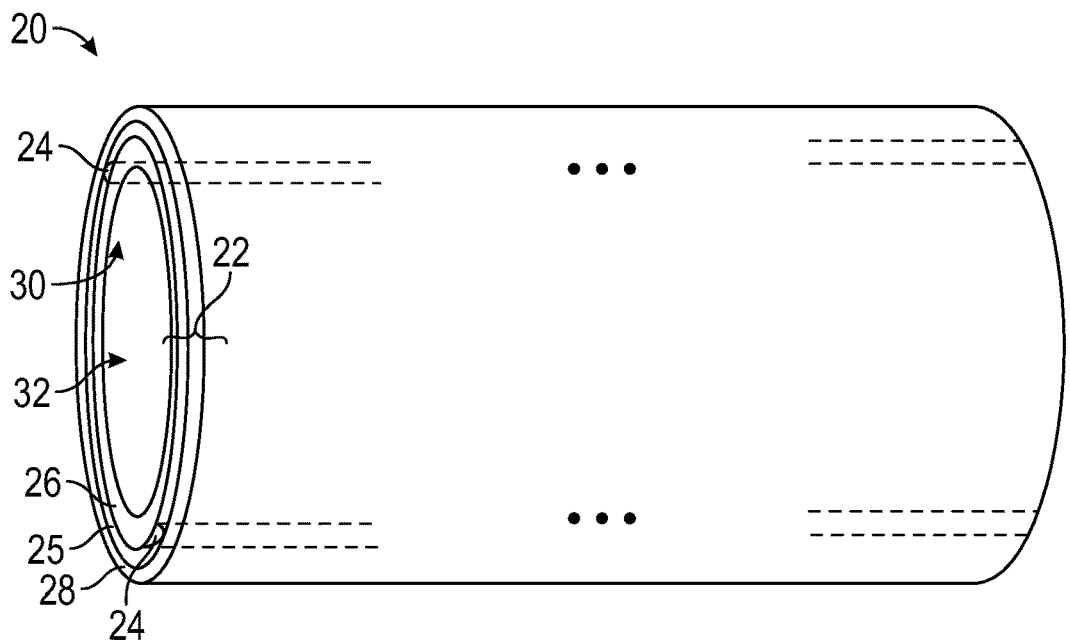
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with annular gaps (e.g., fluid conduits and/or free space) 24 defined in its annulus 25, is shown in FIG. 2. As depicted, the pipe segment tubing 22 is implemented with multiple tubing layers including an internal pressure sheath (e.g., inner barrier) layer 26 and an outer sheath (e.g., outer barrier) layer 28. In some embodiments, the internal pressure sheath layer 26 and/or the outer sheath layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the internal pressure sheath layer 26 defines (e.g., encloses) a pipe bore 32 through which fluid can flow, for example, to facilitate transporting fluid from a bore fluid source 12 to a bore fluid destination 14.

Additionally, as depicted, the tubing annulus 25 of the pipe segment 20 is implemented between its internal pressure sheath layer 26 and its outer sheath layer 28. As will be described in more detail below, the tubing annulus 25 of a pipe segment 20 may include one or more intermediate layers. Furthermore, as depicted, annular gaps 24 running along the length of the pipe segment 20 are defined (e.g., enclosed) in the tubing annulus 25. As described above, an annular gap 24 in the tubing annulus 25 may be devoid of solid material. As such, pipe segment tubing 22 that includes one or more annular gaps 24 defined therein may include less solid material and, thus, exert less resistance to flexure, for example, as compared to solid pipe segment tubing 22 and/or pipe segment tubing 22 that does not include annular gaps 24 defined its annulus 25. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more than two (e.g., three, four, or more) annular gaps 24 defined in its tubing annulus 25. Additionally or alternatively, in other embodiments, an annular gap 24 defined in the tubing annulus 25 of a pipe segment 20 may run non-parallel to the pipe bore 32 of the pipe segment 20, for example, such that the annular gap 24 is skewed relative to the longitudinal extent of the pipe bore 32.

Figure 3:
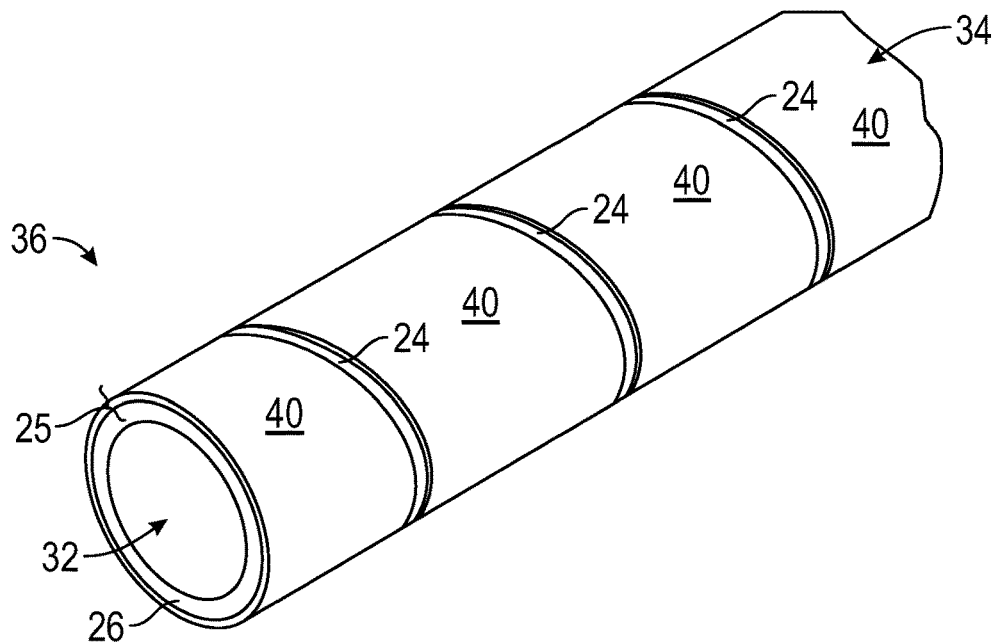
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an internal pressure sheath layer 26 and an intermediate layer—namely a reinforcement layer 34—included in the annulus 25 of its pipe segment tubing 22, is shown in FIG. 3. However, it should be appreciated that the depicted example is merely intended to be illustrative and not limiting. In particular, in other embodiments, the intermediate layers of pipe segment tubing 22 may additionally or alternatively include one or more tape layers, one or more insulation layers one or more intermediate sheath layers, one or more anti-wear layers, or any combination thereof.

In any case, as depicted, the reinforcement layer 34 includes a reinforcement strip 40. To facilitate improving tensile strength and/or hoop strength of pipe segment tubing 22, in some embodiments, a reinforcement strip 40 in the pipe segment tubing 22 may be implemented at least in part using solid material that has a higher tensile strength and/or a higher linear elasticity modulus (e.g., stiffness) than solid material that is used to implement the internal pressure sheath layer 26 and/or the outer sheath layer 28 of the pipe segment tubing. For example, the internal pressure sheath layer 26 may be implemented using plastic, such as high-density polyethylene (HDPE), while the reinforcement strip 40 is implemented using metal, such as carbon steel, stainless steel, duplex stainless steel, super duplex stainless steel, or any combination thereof. In other words, at least in some such embodiments, a reinforcement strip 40 of the pipe segment tubing 22 may be implemented using electrically conductive material, which, at least in some instances, may enable communication of electrical (e.g., control and/or sensor) signals via the reinforcement strip 40. However, in other embodiments, one or more reinforcement strips 40 of pipe segment tubing 22 may additionally or alternatively be implemented at least in part using a composite material and/or a polymer (e.g., plastic).

Additionally, as depicted, the reinforcement strip 40 is helically disposed (e.g., wound and/or wrapped) on the internal pressure sheath layer 26 such that gaps (e.g., openings) are left between adjacent windings to define an annular gap (e.g., fluid conduit) 24. In other words, in some embodiments, the reinforcement layer 34 may be implemented at least in part by winding the reinforcement strip 40 around the internal pressure sheath layer 26 at a non-zero lay angle (e.g., fifty-four degrees) relative to the longitudinal axis of the pipe bore 32. In any case, as depicted, the resulting annular gap 24 runs helically along the pipe segment 20, for example, such that the annular gap 24 is skewed fifty-four degrees relative to the longitudinal axis of the pipe bore 32.

However, it should again be appreciated that the depicted example is merely intended to be illustrative and not limiting. In particular, in some embodiments, one or more other intermediate layers, such as an anti-wear layer, may be implemented between the internal pressure sheath layer 26 and a reinforcement layer 34 of pipe segment tubing 22. In other words, in some such embodiments, a reinforcement strip 40 of the reinforcement layer 34 may be disposed on another intermediate layer, for example, instead of directly on the internal pressure sheath layer 26 of the pipe segment tubing 22. Moreover, in other embodiments, a reinforcement layer 34 of pipe segment tubing 22 may include multiple reinforcement strips 40.

In any case, in some embodiments, an outer sheath layer 28 may be disposed directly over the depicted reinforcement layer 34 and, thus, cover and/or define (e.g., enclose) the depicted annular gap 24. However, in other embodiments, the tubing annulus 25 of pipe segment tubing 22 may include multiple (e.g., two, three, four, or more) reinforcement layers 34. In other words, in such embodiments, one or more other reinforcement layers 34 may be disposed over the depicted reinforcement layer 34. In fact, in some such embodiments, the reinforcement strips 40 in the one or more other reinforcement layers 34 may also each be helically disposed such that there are annular gaps (e.g., fluid conduits and/or free space) 24 between adjacent windings.

For example, a first other reinforcement strip 40 of a first other reinforcement layer 34 may be helically disposed on the depicted reinforcement strip 40 using the same non-zero lay angle as the depicted reinforcement strip 40 to cover (e.g., enclose) the depicted annular gap 24 and to define another annular gap 24 in the first other reinforcement layer 34. Additionally, a second other reinforcement strip 40 of a second other reinforcement layer 34 may be helically disposed on the first other reinforcement strip 40 using another non-zero lay angle, which is the inverse of the non-zero lay angle of the depicted reinforcement strip 40, to define another annular gap 24 in the second other reinforcement layer 34. Furthermore, a third other reinforcement strip 40 of a third other reinforcement layer 34 may be helically disposed on the second other reinforcement strip 40 using the same non-zero lay angle as the second other reinforcement strip 40 to cover the other annular gap 24 in the second other reinforcement layer 34 and to define another annular gap 24 in the third other reinforcement layer 34. In some embodiments, an outer sheath layer 28 may be disposed over the third other reinforcement layer 34 and, thus, cover (e.g., enclose) the other annular gap 24 in the third other reinforcement layer 34.

In any case, as described above, in some instances, a pipe segment 20 may be deployed in an elevated pressure environment, for example, underwater in a subsea application. To facilitate improving the collapse and/or crush resistance of its tubing 22, a carcass layer may be disposed within the internal pressure sheath layer 26 of the pipe segment 20. In other words, in such instances, the internal pressure sheath layer 26 may be disposed around the carcass layer and, thus, the carcass layer may be the innermost layer of the pipe segment tubing 22.

Figure 4:
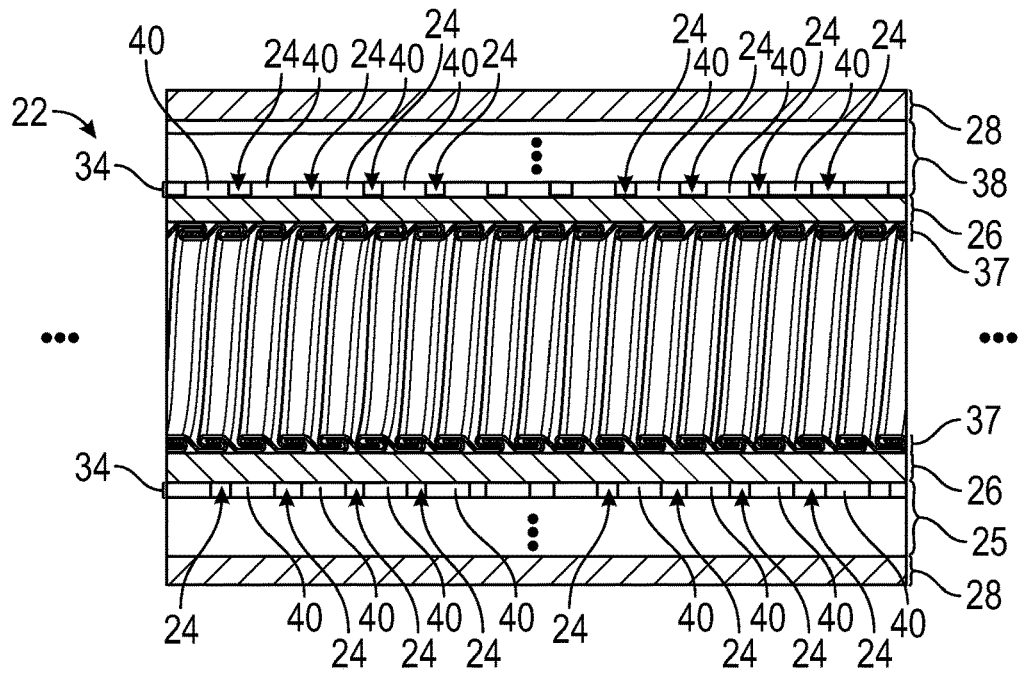
FIG. 4 is an axial cross-section profile of an example of a pipe segment that includes a carcass layer, in accordance with an embodiment of the present disclosure.

To help illustrate, an example of pipe segment tubing 22 that includes a carcass layer 37 is shown in FIG. 4. To facilitate improving collapse and/or crush resistance, in some embodiments, the carcass layer 37 may be made from metal, such as carbon steel, stainless steel, duplex stainless steel, super duplex stainless steel, or any combination thereof. Additionally, as depicted, the carcass layer 37 is an interlocked layer in the pipe segment tubing 22.

In addition to the carcass layer 37, as depicted, the pipe segment tubing 22 includes an internal pressure sheath layer 26 and an outer sheath layer 28. Furthermore, as depicted, the pipe segment tubing 22 includes intermediate layers 38 disposed between the internal pressure sheath layer 26 and the outer sheath layer 28 and, thus, in the annulus 25 of the pipe segment tubing 22. In particular, as depicted, the intermediate layers 38 include at least a reinforcement layer 34 with one or more reinforcement strips 40 that are implemented to define one or more annular gaps (e.g., fluid conduits and/or free space) 24 in the tubing annulus 25.

However, it should be appreciated that the depicted example is merely intended to be illustrative and not limiting. In particular, as mentioned above, in some embodiments, the intermediate layers 38 of pipe segment tubing 22 may additionally or alternatively include one or more tape layers, one or more intermediate sheath layers, one or more anti-wear layers, one or more insulation layers, or any combination thereof. Additionally, as described above, in some embodiments, pipe segment tubing 22 may include multiple reinforcement layers 34, which each include one or more reinforcement strips 40. Moreover, although the present disclosure describes examples that include a carcass layer 37, in other embodiments, the techniques may be used with pipe segment tubing 22 that does not include a carcass layer 37. In any case, as described above, in a pipeline system 10, the tubing 22 of a pipe segment 20 may generally be secured and sealed in a pipe fitting 18.

Figure 5:
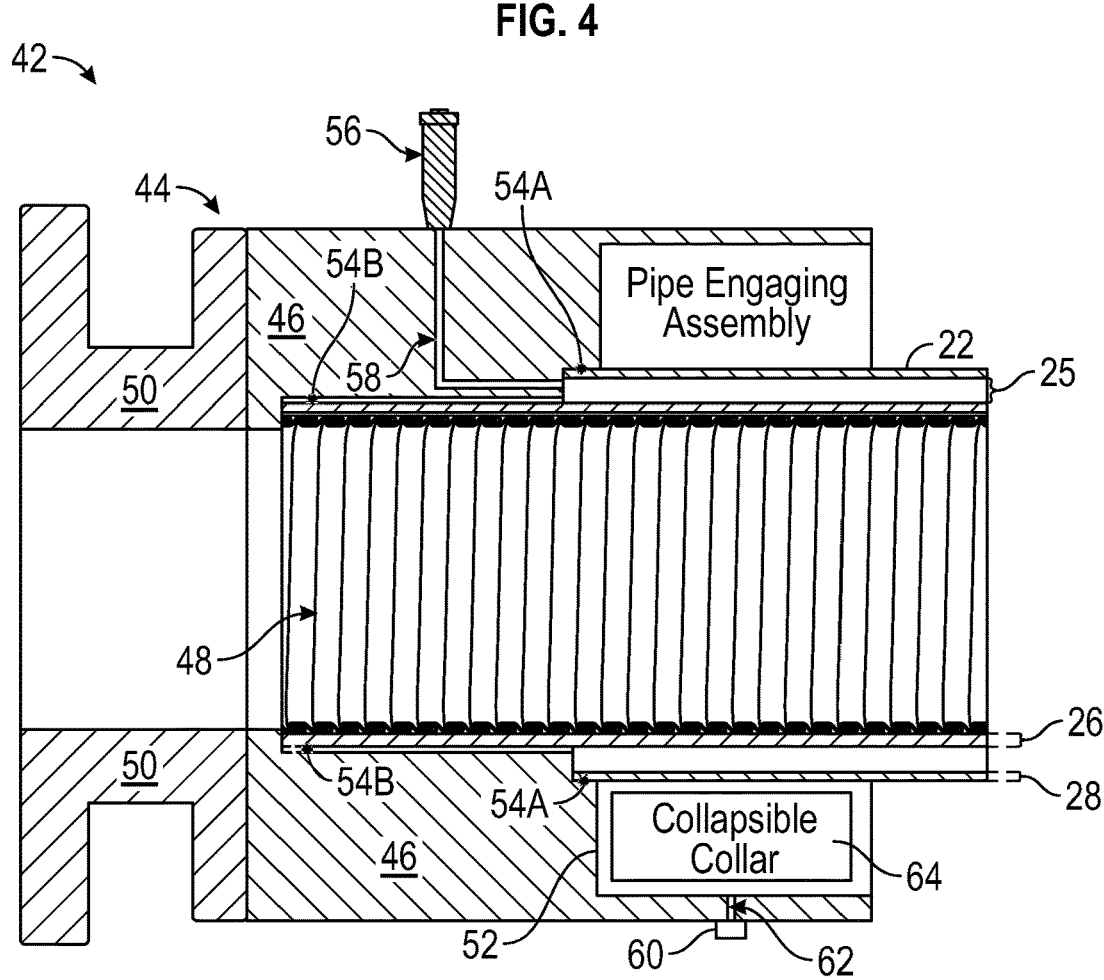
FIG. 5 is axial cross-section profile of a portion of a pipeline system that includes the pipe segment of FIG. 4 and a reusable pipe fitting, in accordance with an embodiment of the present disclosure.

To help illustrate, an example of a portion 42 of a pipeline system 10, which includes a pipe fitting 18—namely a reusable pipe fitting 44—and pipe segment tubing 22, is shown in FIG. 5. As depicted, a reusable pipe fitting 44 generally includes a fitting body 46, which defines a body (e.g., fitting) bore 48 in which an end of the pipe segment tubing 22 is or is to be disposed, a fitting connector 50, a pipe engaging assembly 52, and fitting seals 54. In particular, the pipe engaging assembly 52 may be implemented and/or operated to facilitate selectively securing the reusable pipe fitting 44 to the pipe segment tubing 22 and the fitting connector 50 may be implemented to enable the reusable pipe fitting 44 to be connected to another pipeline component, such as a bore fluid source 12, a bore fluid destination 14, or another pipe fitting 18.

As described above, free space (e.g., one or more fluid conduits and/or annular gaps 24) may be defined within the annulus 25 of pipe segment tubing 22. To facilitate sealing the free space in the tubing annulus 25 from external environmental conditions, as in the depicted example, the fitting seals 54 of a reusable pipe fitting 44 may include one or more outer fitting seals 54A, which are each implemented to be compressed against the outer sheath layer 28 of pipe segment tubing 22. Additionally, to facilitate sealing the free space in the tubing annulus 25 from bore fluid within the body bore 48 of a reusable pipe fitting 44, as in the depicted example, the fitting seals 54 of the reusable pipe fitting 44 may include one or more inner fitting seals 54B, which are each implemented to be compressed against the internal pressure sheath layer 26 of pipe segment tubing 22. Thus, to facilitate sealing the free space in the tubing annulus 25, as in the depicted example, the outer sheath layer 28 and each intermediate layer 38 in the tubing annulus 25 may be cut back relative to the internal pressure sheath layer 26 of the pipe segment tubing 22.

In some embodiments, one or more fitting seals 54 in a reusable pipe fitting 44 may be made from metal. For example, in some such embodiments, a fitting seal 54 in the reusable pipe fitting 44 may be made from carbon steel, stainless steel, duplex stainless steel, super duplex stainless steel, or any combination thereof. However, in other embodiments, one or more fitting seals 54 in a reusable pipe fitting 44 may be made from non-metallic material. For example, in some such embodiments, a fitting seal 54 in the reusable pipe fitting 44 may be made from a polymer, rubber, and/or plastic.

In any case, as in the depicted example, to facilitate venting the annulus 25 of pipe segment tubing 22, in some embodiments, a reusable pipe fitting 44 may include one or more vent ports 56, which are each fluidly connected to free space defined within the tubing annulus 25. In particular, as in the depicted example, in some such embodiments, a vent port 56 of a reusable pipe fitting 44 may be fluidly connected to the annulus 25 of pipe segment tubing 22 via a vent path 58 defined in the fitting body 46 of the reusable pipe fitting 44. Additionally, as in the depicted example, to enable flowing fluid (e.g., lubricant) into its pipe engaging assembly 52 and/or flushing fluid out from its pipe engaging assembly 52, in some embodiments, a reusable pipe fitting 44 may include one or more fluid ports 60, which are each fluidly connected to the pipe engaging assembly 52. In particular, as in the depicted example, in some such embodiments, a fluid port 60 of a reusable pipe fitting 44 may be fluidly connected to the pipe engaging assembly 52 via a fluid path 62 defined in the fitting body 46 of the reusable pipe fitting 44.

However, it should be appreciated that the depicted example is merely intended to be illustrative and not limiting. In particular, in other embodiments, a reusable pipe fitting 44 may not include a vent port 56 or include more than one (e.g., two, three, or more) vent ports 56. Additionally, in other embodiments, a reusable pipe fitting 44 may not include a fluid port 60 fluidly connected to its pipe engaging assembly 52 or include more than one (e.g., two, three, or more) fluid ports 60 fluidly connected to its pipe engaging assembly 52.

In any case, as depicted, to facilitate selectively securing a reusable pipe fitting 44 to pipe segment tubing 22, the pipe engaging assembly 52 of the reusable pipe fitting 44 generally includes at least a collapsible collar 64. In particular, contracting the collapsible collar 64 radially inward may cause its inner surface to engage the outer surface of pipe segment tubing and, thus, secure the reusable pipe fitting 44 to the pipe segment tubing 22. On the other hand, expanding the collapsible collar 64 radially outward may cause its outer surface to disengage from the outer surface of the pipe segment tubing 22 and, thus, enable the reusable pipe fitting 44 to be removed from the pipe segment tubing 22, for example, for re-deployment at other pipe segment tubing 22.

To enable dynamically (e.g., adaptively) adjusting its inner surface diameter, the collapsible collar 64 in a pipe engaging assembly 52 may include multiple collar (e.g., "dog") segments such that open space is present between adjacent collar segments at least while the pipe engaging assembly is in a deactivated state. For example, in some embodiments, the collapsible collar 64 in a pipe engaging assembly 52 may include multiple separate collar segments. However, in other embodiments, the collapsible collar 64 in a pipe engaging assembly 52 may be implemented with a ring that has slits cut therein to partially separate adjacent collar segments. In any case, in this manner, adjacent collar segments in the collapsible collar 64 may move into the open space therebetween as the pipe engaging assembly 52 is transitioned toward its activate state.

Additionally, to facilitate improving securement strength provided by a reusable pipe fitting 44, in some embodiments, the inner surface of the collapsible collar 64 in its pipe engaging assembly 52 may include one or more teeth (e.g., serrations) that extend radially inward. Furthermore, as will be described in more detail below, to facilitate controlling the inner surface diameter of its collapsible collar 64, in some embodiments, the pipe engaging assembly 52 of a reusable pipe fitting 44 may include multiple radial threaded fasteners (e.g., bolts and/or screws), which are each implemented to be secured through a radial fastener opening in the fitting body 46 of the reusable pipe fitting 44 such that its threaded end abuts the outer surface of a corresponding collar segment in the collapsible collar 64. However, to facilitate controlling the inner surface diameter of its collapsible collar 64, in other embodiments, the pipe engaging assembly 52 of a reusable pipe fitting 44 may include an activation collar, which may be disposed circumferentially around at least a portion of its collapsible collar 64.

Figure 6:
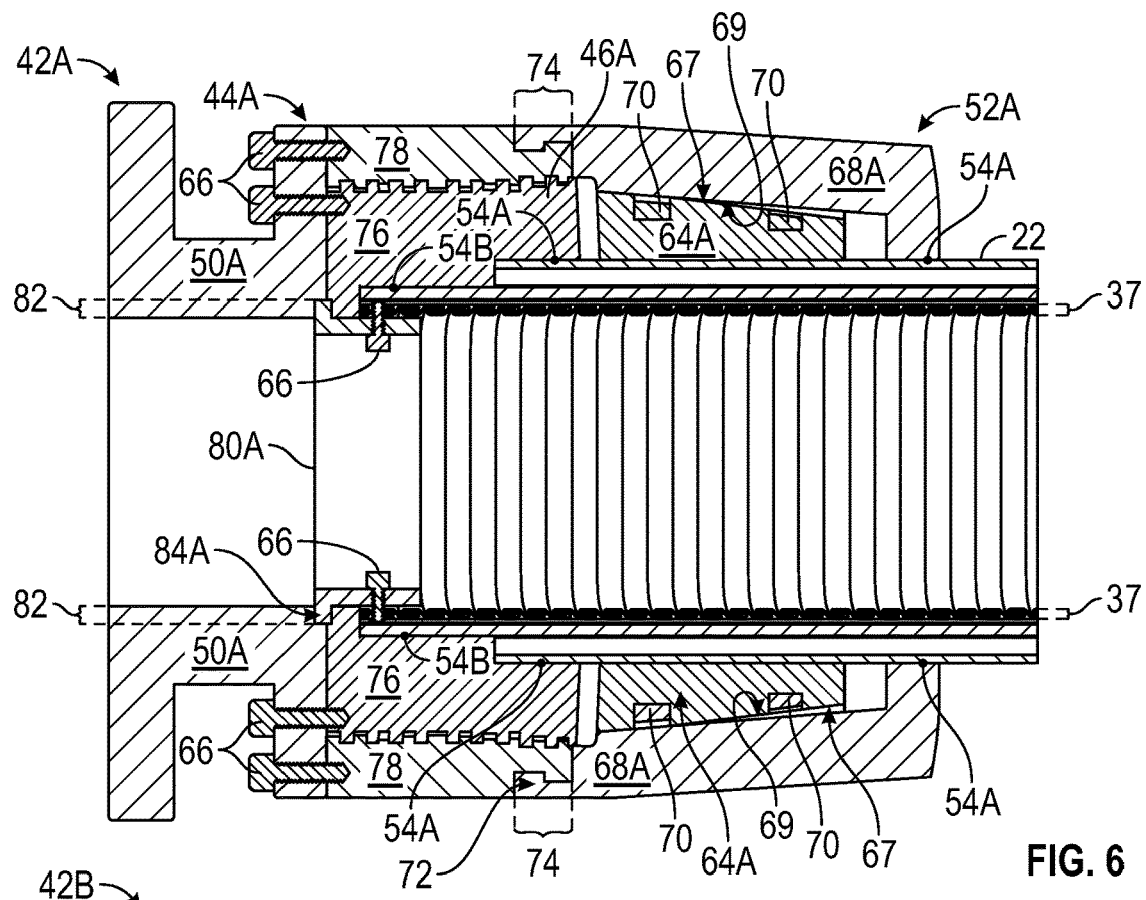
FIG. 6 is axial cross-section profile of a portion of a pipeline system that includes the pipe segment of FIG. 4 and an example of the reusable pipe fitting of FIG. 5, in accordance with an embodiment of the present disclosure.

To help illustrate, a portion 42A of a pipeline system 10, which includes an example of a reusable pipe fitting 44A and pipe segment tubing 22, is shown in FIG. 6. As depicted, the reusable pipe fitting 44A generally includes a fitting connector 50A, a fitting body 46A, a pipe engaging assembly 52A, and fitting seals 54. In particular, as in the depicted example, in some embodiments, the fitting connector 50 of a reusable pipe fitting 44 may be secured to its fitting body 46 via one or more threaded fasteners 66, such as a bolt or a screw.

However, it should be appreciated that the depicted example is merely intended to be illustrative and not limiting. In particular, in other embodiments, the fitting connector 50 of a reusable pipe fitting 44 may be secured to the fitting body 46 of the reusable pipe fitting 44 via fewer than four (e.g., three, two, or one) threaded fasteners 66 or more than four (e.g., five, six, or more) threaded fasteners 66. Alternatively, in other embodiments, the fitting connector 50 of a reusable pipe fitting 44 may be secured to the fitting body 46 of the reusable pipe fitting 44 via hot tooling, such as welding and/or brazing.

In any case, as depicted, in addition to a collapsible collar 64A, the pipe engaging assembly 52A of the reusable pipe fitting 44A includes an activation collar 68A, which is disposed circumferentially around the collapsible collar 64A. In particular, as in the depicted example, in some embodiments, the collapsible collar 64 of a pipe engaging assembly 52 may have a male taper and, thus, a conical outer surface 67 and a wedge-shaped axial cross-section profile. On the other hand, as in the depicted example, the activation collar 68 may have a female taper (e.g., socket) and, thus, a conical inner surface 69 and a wedge-shaped axial cross-section profile.

Additionally, as in the depicted example, the activation collar 68 of a pipe engaging assembly 52 may be disposed external to a corresponding collapsible collar 64 such that the conical inner surface 69 of the activation collar 68 can slide along the conical outer surface 67 of the collapsible collar 64, for example, when external force is applied to activation collar 68. Due to the collar slopes, as will be described in more detail below, the activation state of the pipe engaging assembly 52 may be controlled at least in part by controlling the position of its activation collar 68 on a corresponding collapsible collar 64. In particular, in some embodiments, the pipe engaging assembly 52 may be in its activated state when an inner surface diameter of its collapsible collar 64 is less than or equal to (e.g., not greater than) a default (e.g., natural, original, and/or uncompressed) outer surface diameter of pipe segment tubing 22 secured or to be secured therein. On the other hand, the pipe engaging assembly 52 may be in a deactivated state when the inner surface diameter of its collapsible collar 64 is greater than the default outer surface diameter of the pipe segment tubing 22. In other words, in such embodiments, the pipe engaging assembly 52 may be in a deactivated state when its activation collar 68 is at a first (e.g., deactivated) position that results in the inner surface diameter of its collapsible collar 64 being greater than the default outer surface diameter of the pipe segment tubing 22, thereby reducing the resistance (e.g., force) the pipe engaging assembly 52 exerts against movement of the pipe segment tubing 22.

Due to the collar slopes, at least in some instances, transitioning the activation collar 68 of a pipe engaging assembly 52 to a different position on a corresponding collapsible collar 64 may affect (e.g., expand or contract) the inner surface diameter of the collapsible collar 64. To help illustrate, continuing with the above example, moving (e.g., transitioning) the activation collar 68 from the first position to a second (e.g., activated) position, which covers more of the collapsible collar 64, may contract (e.g., collapse and/or compress) the collapsible collar 64 radially inward, for example, such that the inner surface diameter of the collapsible collar 64 is reduced to less than or equal to the default outer surface diameter of the pipe segment tubing 22, thereby transitioning the pipe engaging assembly 52 to its activated state. In other words, when the pipe segment tubing 22 is present therein, moving the activation collar 68 to the second position may result in the inner surface (e.g., one or more teeth) of the collapsible collar 64 engaging (e.g., contacting) the outer surface of the pipe segment tubing 22, thereby increasing the resistance (e.g., force) the pipe engaging assembly 52 exerts against movement of the pipe segment tubing 22 relative to the reusable pipe fitting 44.

Furthermore, as in the depicted example, to facilitate maintaining a collapsible collar 64 of a reusable pipe fitting 44 at a target location on pipe segment tubing 22 before the collapsible collar 64 is secured to the pipe segment tubing 22, in some embodiments, one or more (e.g., elastic) bands 70 may be disposed circumferentially around the collapsible collar 64. However, it should again be appreciated that the depicted example is merely intended to be illustrative and not limiting. In particular, in other embodiments, a reusable pipe fitting 44 may not include a band 70 disposed around its collapsible collar 64, for example, when its collapsible collar 64 is a single ring with slits cut therethrough to partially separate adjacent collar segments.

In any case, as in the depicted example, to facilitate securing a pipe engaging assembly 52 to a corresponding fitting body 46, in some embodiments, a retainer recess 72 may be formed circumferentially along an outer surface of the fitting body 46. Additionally, as in the depicted example, the activation collar 68 of the pipe engaging assembly 52 may include a retainer lip (e.g., extension) 74, which extends out toward the fitting body 46 and is implemented to matingly interlock with the retainer recess 72 on the fitting body 46. Thus, in such embodiments, the activation collar 68 may be moved over a corresponding collapsible collar 64 until the retainer lip 74 on the activation collar 68 matingly interlocks with the retainer recess 72 on the fitting body 46, thereby securing the activation collar 68 to the fitting body 46.

Furthermore, as in the depicted example, to facilitate controlling the position of the activation collar 68 on a corresponding collapsible collar 64, in some embodiments, the fitting body 46 of a reusable pipe fitting 44 may include a threaded inner fitting body 76 and a threaded outer fitting body 78. In particular, as in the depicted example, in some such embodiments, threading may be disposed on an inner surface of the threaded outer fitting body 78 while corresponding threading may be disposed on an outer surface of the threaded inner fitting body 76. In such embodiments, after an activation collar 68 is secured to the threaded outer fitting body 78, tightening the threaded outer fitting body 78 on the threaded inner fitting body 76 may move more of the activation collar 68 onto a corresponding collapsible collar 64 while loosening the threaded outer fitting body 78 from the threaded inner fitting body 76 may move more of the activation collar 68 off of the collapsible collar 64.

However, it should again be appreciated that the depicted example is merely intended to be illustrative and not limiting. In particular, in other embodiments, a threaded outer fitting body 78 of a reusable pipe fitting 44 may be integrated with the activation collar 68 in the pipe engaging assembly 52 of the reusable pipe fitting 44. In other words, in such embodiments, the activation collar 68 may be threaded onto a corresponding threaded inner fitting body 76 and secured directly to a corresponding fitting connector 50, which, at least in some instances, may facilitate further reducing the likelihood that the pipe engaging assembly 52 of the reusable pipe fitting 44 inadvertently transitions from its activated state.

In any case, as in the depicted example, to facilitate anchoring the carcass layer 37 of pipe segment tubing 22 therein, in some embodiments, a reusable pipe fitting 44 may additionally include a carcass (e.g., insulator) ring 80, such as an interior carcass ring 80A. In particular, as in the depicted example, an interior carcass ring 80A may be implemented to be secured to the inner surface of the carcass layer 37 of pipe segment tubing 22 via one or more threaded fasteners 66, such as a bolt or a screw. Additionally, as in the depicted example, to facilitate anchoring the carcass layer 37 of pipe segment tubing 22 in a reusable pipe fitting 44, a lip (e.g., extension) 82 on the interior carcass ring 80A may be disposed within a carcass ring cavity 84A defined within the reusable pipe fitting 44 such that the interior carcass ring 80A directly abuts the fitting body 46 of the reusable pipe fitting 44.

However, it should again be appreciated that the depicted example is merely intended to be illustrative and not limiting. In particular, in other embodiments, a reusable pipe fitting 44 may not include a carcass ring 80, for example, when corresponding pipe segment tubing 22 does not include a carcass layer 37. Alternatively, instead of an interior carcass ring 80A, in other embodiments, a reusable pipe fitting 44 may include an exterior carcass ring 80, which is implemented to be secured to an outer surface of the carcass layer 37 of pipe segment tubing 22.

Figure 7:
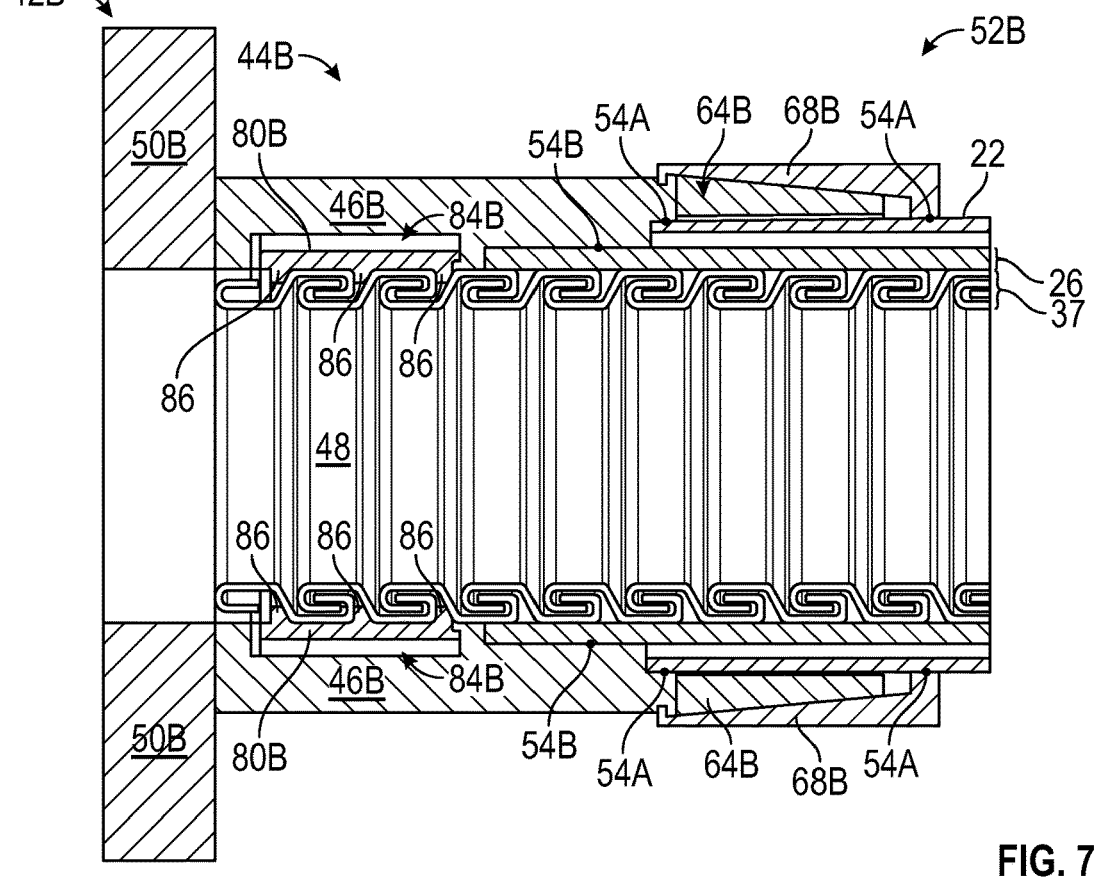
FIG. 7 is axial cross-section profile of a portion of a pipeline system that includes the pipe segment of FIG. 4 and another example of the reusable pipe fitting of FIG. 5, in accordance with an embodiment of the present disclosure.

To help illustrate, a portion 42B of a pipeline system 10, which includes another example of a reusable pipe fitting 44B and pipe segment tubing 22, is shown in FIG. 7. Similar to the reusable pipe fitting 44A of FIG. 6, as depicted in FIG. 7, the reusable pipe fitting 44B generally includes a fitting connector 50B, a fitting body 46B, a pipe engaging assembly 52B, and fitting seals 54. In particular, similar to the pipe engaging assembly 52A of FIG. 6, as depicted in FIG. 7, the pipe engaging assembly 52B includes a collapsible collar 64B and an activation collar 68B. In fact, in some embodiments, the pipe engaging assembly 52B of FIG. 7 may generally match the pipe engaging assembly 52A of FIG. 6.

However, as depicted in FIG. 7, to facilitate anchoring the carcass layer 37 of pipe segment tubing 22 therein, the reusable pipe fitting 44B includes an exterior carcass ring 80B, which is disposed within a carcass ring cavity 84B defined in the fitting body 46B of the reusable pipe fitting 44B, for example, due to the fitting connector 50B being welded to the fitting body 46B and, thus, limiting the ability of the lip 82 of an interior carcass ring 80A to be subsequently disposed therebetween. In particular, as in the depicted example, in some embodiments, an exterior carcass ring 80 may include protrusions 86 that extend radially inward to interlock with contours on the outer surface of the carcass layer 37 of pipe segment tubing 22. In any case, to facilitate engaging an exterior carcass ring 80B of a reusable pipe fitting 44 with the outer surface of the carcass layer 37 of pipe segment tubing 22, as in the depicted example, the internal pressure sheath layer 26 of the pipe segment tubing 22 may be cut back relative to the carcass layer 37.

Additionally, to enable the exterior carcass ring 80B of a reusable pipe fitting 44 to engage (e.g., grip and/or grab onto) the outer surface of the carcass layer 37 of pipe segment tubing 22, in some embodiments, the exterior carcass ring 80B may be made from spring metal, such as spring steel. Thus, in some such embodiments, the reusable pipe fitting 44 may be deployed at pipe segment tubing 22 at least in part by stabbing (e.g., inserting) the pipe segment tubing 22 into the body bore 48 of the reusable pipe fitting 44 such that contours on the outer surface of its carcass layer 37 cause the exterior carcass ring 80B to expand around and grab onto the carcass layer 37.

However, it should be appreciated that the depicted example is merely intended to be illustrative and not limiting. In particular, as will be described in more detail below, in other embodiments, the pipe engaging assembly 52 of a reusable pipe fitting 44 may not include an activation collar 68, for example, when radial threaded fasteners are used to control the inner surface diameter of the collapsible collar 64 in the pipe engaging assembly 52 and, thus, the activation state of the pipe engaging assembly 52. Alternatively, in other embodiments, the activation collar 68 and the collapsible collar 64 of a reusable pipe fitting 44 may be enclosed within the fitting body 46 of the reusable pipe fitting 44.

Figure 8:
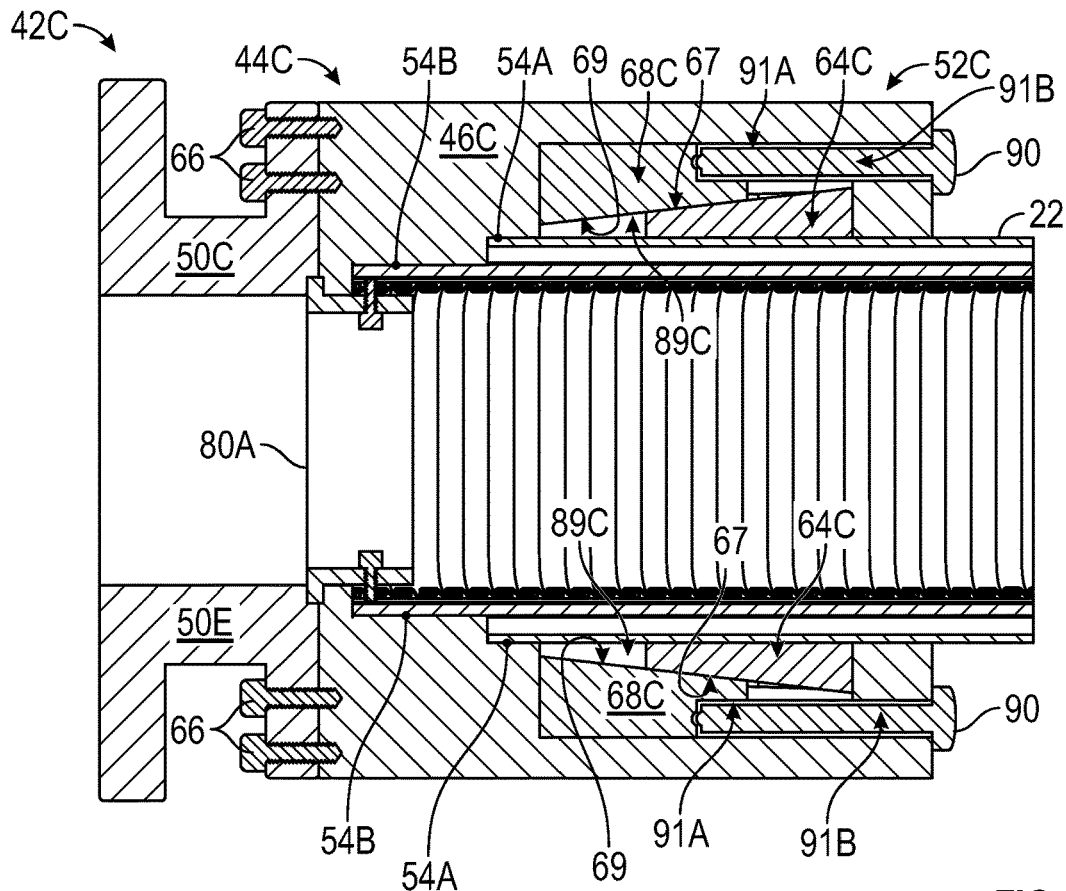
FIG. 8 is axial cross-section profile of a portion of a pipeline system that includes the pipe segment of FIG. 4 and a further example of the reusable pipe fitting of FIG. 5, in accordance with an embodiment of the present disclosure.

To help illustrate, a portion 42C of a pipeline system 10, which includes a further example of a reusable pipe fitting 44C and pipe segment tubing 22, is shown in FIG. 8. Similar to the reusable pipe fitting 44A of FIG. 6, as depicted in FIG. 8, the reusable pipe fitting 44C generally includes a fitting connector 50C, a fitting body 46C, a pipe engaging assembly 52C, and fitting seals 54. In particular, similar to the pipe engaging assembly 52A of FIG. 6, as depicted in FIG. 8, the pipe engaging assembly 52C includes an activation collar 68C, which has a conical inner surface 69, and a collapsible collar 64C, which has a conical outer surface 67.

However, as depicted in FIG. 8, the activation collar 68C and the collapsible collar 64C are circumferentially and axially enclosed within the fitting body 46C of the reusable pipe fitting 44C. In particular, as depicted, the activation collar 68C and the collapsible collar 64C are disposed within a pipe engaging assembly cavity 89C that is defined within the fitting body 46C of the reusable pipe fitting 44C. In other words, as depicted, the fitting body 46C may obstruct the ability to directly manipulate the activation collar 68C.

Thus, as in the depicted example, to facilitate controlling the position of an activation collar 68 on a corresponding collapsible collar 64, in some embodiments, a pipe engaging assembly 52 in a reusable pipe fitting 44 may additionally include one or more axial threaded fasteners 90 that extend into the pipe engaging assembly cavity 89 of the reusable pipe fitting 44. In particular, as in the depicted example, in some such embodiments, an axial threaded fastener 90 may be secured to an axial fastener opening 91A in the activation collar 68 via an axial fastener opening 91B formed through the fitting body 46 of the reusable pipe fitting 44. Thus, in such embodiments, tightening the axial threaded fastener 90 in the axial fastener openings 91 may move (e.g., pull) more of the activation collar 68 onto the collapsible collar 64 and, thus, facilitate transitioning the pipe engaging assembly 52 of the reusable pipe fitting 44 toward its activated position.

On the other hand, loosening the axial threaded fastener 90 from the axial fastener openings 91 may move (e.g., push) more of the activation collar 68 off of the collapsible collar 64 and, thus, facilitate transitioning the pipe engaging assembly 52 of the reusable pipe fitting 44 away from its activated state, for example, to enable the reusable pipe fitting 44 to be removed from pipe segment tubing 22 and re-deployed at different pipe segment tubing 22.

However, it should be appreciated that the depicted example is merely intended to be illustrative and not limiting. In particular, in other embodiments, a reusable pipe fitting 44 may include an axial threaded fastener 90 that extends through an axial fastener opening 91 in the fitting body 46 of the reusable pipe fitting 44 and abuts the activation collar 68 of the reusable pipe fitting 44 such that tightening the axial threaded fastener 90 extends its threaded end farther into the pipe engaging assembly cavity 89 of the reusable pipe fitting 44 such that more of the activation collar 68 is pushed onto the collapsible collar 64 of the reusable pipe fitting 44 while loosening the axial threaded fastener 90 retracts its threaded end and, thus, enables more of the activation collar 68 to move off of the collapsible collar 64. Moreover, in other embodiments, the fitting body 46, the activation collar 68, and/or the collapsible collar 64 of a reusable pipe fitting 44 may have a different geometry.

Figure 9:
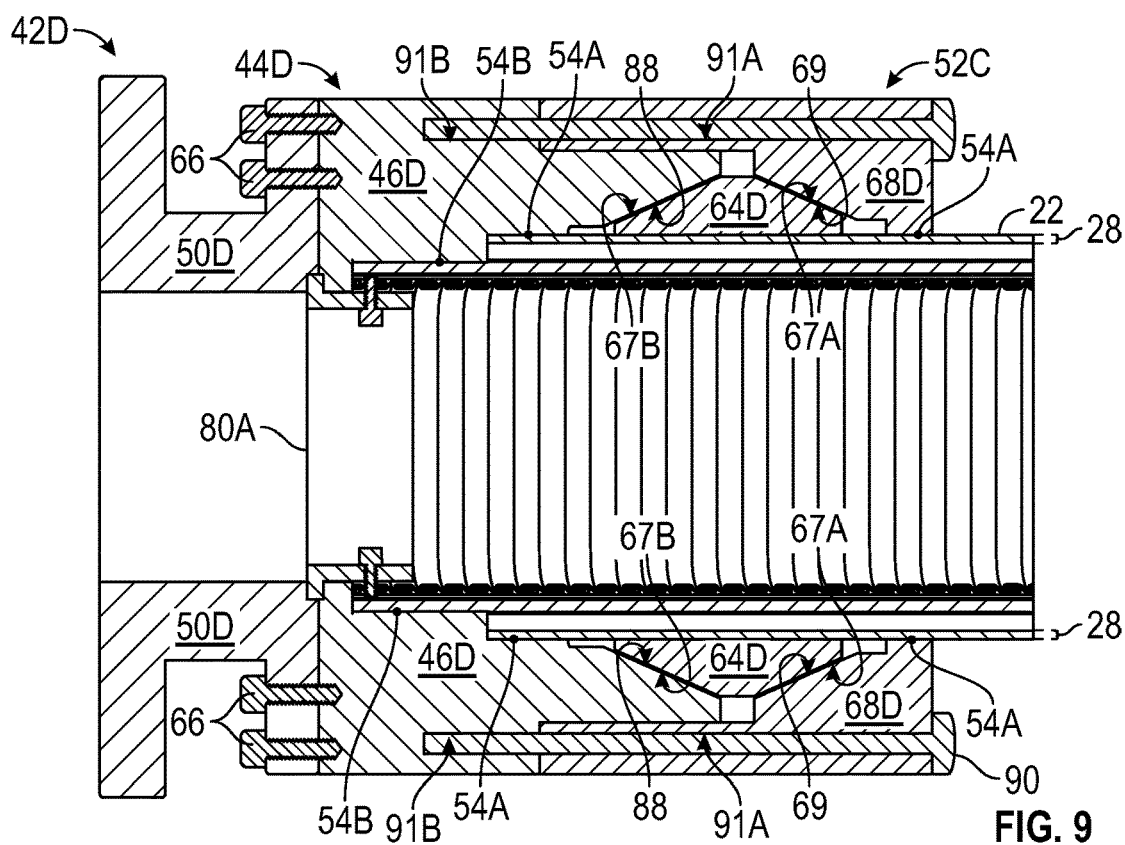
FIG. 9 is axial cross-section profile of a portion of a pipeline system that includes the pipe segment of FIG. 4 and another example of the reusable pipe fitting of FIG. 5, in accordance with an embodiment of the present disclosure.

To help illustrate, a portion 42D of a pipeline system 10, which includes another example of a reusable pipe fitting 44D and pipe segment tubing 22, is shown in FIG. 9. Similar to the reusable pipe fitting 44A of FIG. 6, as depicted in FIG. 9, the reusable pipe fitting 44D generally includes a fitting connector 50D, a fitting body 46D, a pipe engaging assembly 52D, and fitting seals 54. In particular, similar to the pipe engaging assembly 52A of FIG. 6, as depicted in FIG. 9, the reusable pipe fitting 44D generally includes a collapsible collar 64D and an activation collar 68D.

However, as depicted in FIG. 9, the fitting body 46D of the reusable pipe fitting 44D includes a female taper and, thus, a conical inner surface 88 and a wedge-shaped axial cross-section profile. Additionally, as depicted in FIG. 9, the collapsible collar 64D includes a first male taper on a first side and, thus, a first conical outer surface 67A as well as a second male taper on a second side and, thus, a second conical outer surface 67B. In other words, as in the depicted example, in some embodiments, the collapsible collar 64 in a pipe engaging assembly 52 of a reusable pipe fitting 44 may have a trapezoidal cross-section profile.

Moreover, as in the depicted example, in some embodiments, the collapsible collar 64 in a pipe engaging assembly 52 of a reusable pipe fitting 44 may be disposed internal to a corresponding activation collar 68 as well as the fitting body 46 of the reusable pipe fitting 44. In particular, in such embodiments, the collapsible collar 64 may be disposed internal to the activation collar 68 and the fitting body 46 such that a conical inner surface 69 of the activation collar 68 can slide along a first conical outer surface 67A of the collapsible collar 64 and a second conical outer surface 67B of the collapsible collar 64 can slide along a conical inner surface 88 of the fitting body 46, for example, when force is exerted to move the fitting body 46 and the activation collar 68 toward one another. Due to the collar slopes and the fitting body slope, in such embodiments, the inner surface diameter of the collapsible collar 64 and, thus, the activation state of the pipe engaging assembly 52 may be controlled based at least in part on the positions of the fitting body 46 and the activation collar 68 on the collapsible collar 64. In particular, moving the fitting body 46 and the activation collar 68 toward one another may cover more of the collapsible collar 64, thereby contracting the collapsible collar 64 radially inward and, thus, transitioning the pipe engaging assembly 52 toward its activated state. On the other hand, moving the fitting body 46 and the activation collar 68 away from one another may cover less of the collapsible collar 64, thereby enabling the collapsible collar 64 to expand radially outward and, thus, transitioning the pipe engaging assembly 52 away from its activated state.

To control the position of a fitting body 46 and an activation collar 68 on a corresponding collapsible collar 64, as in the depicted example, in some embodiments, a reusable pipe fitting 44 may include one or more axial threaded fasteners 90, such as a bolt or a screw. In particular, as in the depicted example, an axial threaded fastener 90 may be secured in an axial fastener opening 91A in the activation collar 68 as well as a corresponding axial fastener opening 91B in the fitting body 46. Thus, in such embodiments, tightening the axial threaded fastener 90 in the axial fastener openings 91 may move the fitting body 46 and the activation collar 68 toward one another and, thus, transition a pipe engaging assembly 52 of the reusable pipe fitting 44 toward its activated state. On the other hand, in such embodiments, loosening the axial threaded fastener 90 from the axial fastener openings 91 may move the fitting body 46 and the activation collar 68 away from one another and, thus, transition the pipe engaging assembly 52 away from its activated state, for example, to enable the reusable pipe fitting 44 to be removed from pipe segment tubing 22 and re-deployed at different pipe segment tubing 22.

However, it should be appreciated that the depicted example is merely intended to be illustrative and not limiting. In particular, although an interior carcass ring 80A is depicted, in other embodiments, the reusable pipe fitting 44D may not include a carcass ring 80 or, alternatively, include an exterior carcass ring 80B. Additionally, in other embodiments, a reusable pipe fitting 44 may include a single axial threaded fastener 90 or more than two (e.g., three, four, or more) axial threaded fasteners 90. Alternatively, in other embodiments, a threaded fastener 66 used to secure the fitting connector 50 of a reusable pipe fitting 44 to the fitting body 46 of the reusable pipe fitting 44 may also be used to secure the fitting body 46 to the activation collar 68 of the reusable pipe fitting 44, thereby obviating inclusion of a separate axial threaded fastener 90 in the pipe engaging assembly 52 of the reusable pipe fitting 44. Moreover, although an outer fitting seal 54A is depicted as being disposed just between the activation collar 68 of a reusable pipe fitting 44 and the outer sheath layer 28 of pipe segment tubing 22, in other embodiments, the reusable pipe fitting 44 may additionally include a seal collar, which is implemented to activate the outer fitting seal 54A at least in part by actively compressing the outer fitting seal 54A between the activation collar 68, the seal collar, and the outer sheath layer 28 of the pipe segment tubing 22.

Figure 10:
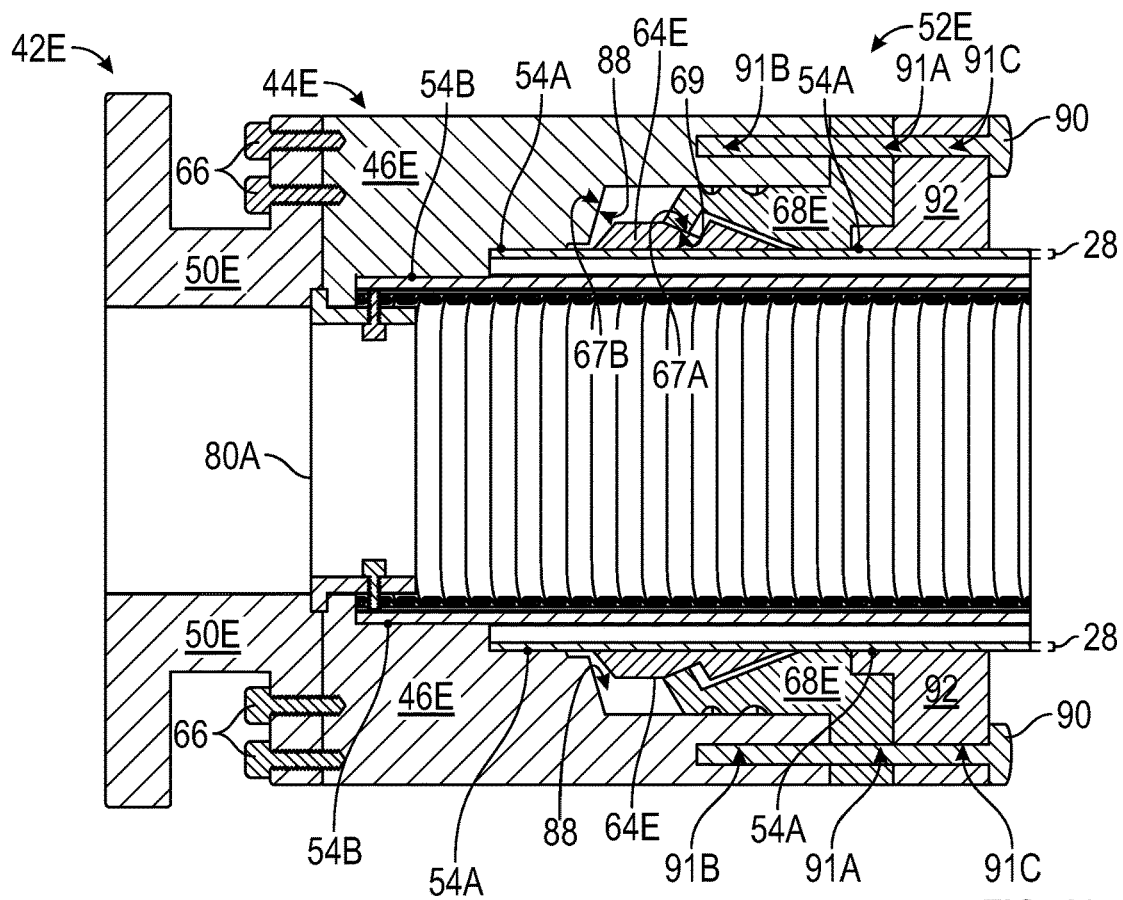
FIG. 10 is axial cross-section profile of a portion of a pipeline system that includes the pipe segment of FIG. 4 and a further example of the reusable pipe fitting of FIG. 5, in accordance with an embodiment of the present disclosure.

To help illustrate, a portion 42E of a pipeline system 10, which includes a further example of a reusable pipe fitting 44E and pipe segment tubing 22, is shown in FIG. 10. Similar to the reusable pipe fitting 44D of FIG. 9, as depicted in FIG. 10, the reusable pipe fitting 44E generally includes a fitting connector 50E, a fitting body 46E, a pipe engaging assembly 52E, and fitting seals 54. In particular, similar to the fitting body 46D of FIG. 9, as depicted, the fitting body 46E of FIG. 10 includes a conical inner surface 88. Additionally, similar to the pipe engaging assembly 52D of FIG. 9, as depicted, the pipe engaging assembly 52E of FIG. 10 includes an activation collar 68E, which has a conical inner surface 69, and a collapsible collar 64E, which has a first conical outer surface 67A and a second conical outer surface 67B. In fact, in some embodiments, the pipe engaging assembly 52E of FIG. 10 may generally be operated in the same manner as the pipe engaging assembly 52D of FIG. 9.

However, as depicted in FIG. 10, the reusable pipe fitting 44E additionally includes a seal collar 92. Furthermore, as depicted, an outer fitting seal 54A is disposed between the seal collar 92 and the activation collar 68E. In particular, as in the depicted example, a seal collar 92 of a reusable pipe fitting 44 may be secured to a corresponding activation collar 68 such that an outer fitting seal 54A is actively compressed between the seal collar 92, the activation collar 68, and the outer sheath layer 28 of pipe segment tubing 22.

To facilitate securing a seal collar 92 to a corresponding activation collar 68, as in the depicted example, in some embodiments, a reusable pipe fitting 44 may include one or more axial threaded fasteners 90, such as a bolt or a screw. In particular, as in the depicted example, an axial threaded fastener 90 may be secured in an axial fastener opening 91A in the activation collar 68 and a corresponding threaded fastener opening 91C in the seal collar 92, for example, in addition to a corresponding axial fastener opening 91B in the fitting body 46 of the reusable pipe fitting 44. Thus, in such embodiments, tightening the axial threaded fastener 90 may move the seal collar 92 and the activation collar 68 toward one another such that a corresponding outer fitting seal 54A is actively compressed between the seal collar 92, the activation collar 68, and the outer sheath layer 28 of pipe segment tubing 22, which, at least in some instances, may improve sealing integrity provided by the outer fitting seal 54A.

However, it should be appreciated that the depicted example is merely intended to be illustrative and not limiting. In particular, although an interior carcass ring 80A is depicted, in other embodiments, the reusable pipe fitting 44E may not include a carcass ring 80 or, alternatively, include an exterior carcass ring 80B. Additionally, in other embodiments, the reusable pipe fitting 44E may not include a seal collar 92, for example, when an outer fitting seal 54A is just disposed in its activation collar 68E. Furthermore, in other embodiments, a threaded fastener 66 used to secure the fitting connector 50 of a reusable pipe fitting 44 to the fitting body 46 of the reusable pipe fitting 44 may also be used to secure a seal collar 92 of the reusable pipe fitting 44 to the activation collar 68 of the reusable pipe fitting 44, thereby obviating inclusion of a separate axial threaded fastener 90 in the pipe engaging assembly 52 of the reusable pipe fitting 44. Alternatively, in other embodiments, a first axial threaded fastener 90 may be used to secure the activation collar 68 of a reusable pipe fitting 44 to the fitting body 46 of the reusable pipe fitting 44 while a second axial threaded fastener 90 may be used to secure a seal collar 92 of the reusable pipe fitting 44 to the activation collar 68. Moreover, as mentioned above, in other embodiments, the pipe engaging assembly 52 of a reusable pipe fitting 44 may not include an activation collar 68, for example, when radial threaded fasteners are used to control the inner surface diameter of the collapsible collar 64 in the pipe engaging assembly 52 and, thus, the activation state of the pipe engaging assembly 52.

Figure 11:
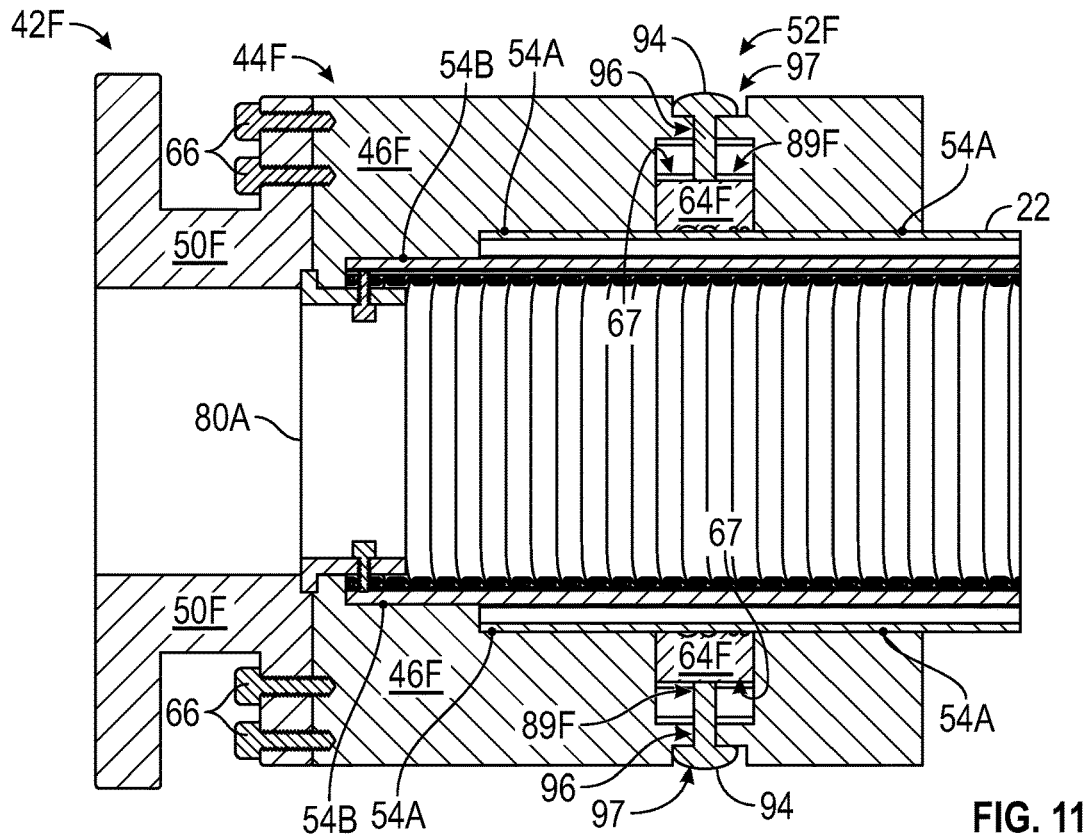
FIG. 11 is axial cross-section profile of a portion of a pipeline system that includes the pipe segment of FIG. 4 and another example of the reusable pipe fitting of FIG. 5, in accordance with an embodiment of the present disclosure.

To help illustrate, a portion 42F of a pipeline system 10, which includes another example of a reusable pipe fitting 44F and pipe segment tubing 22, is shown in FIG. 11. Similar to the reusable pipe fitting 44A of FIG. 6, as depicted, the reusable pipe fitting 44F of FIG. 11 generally includes a fitting connector 50F, a fitting body 46F, a pipe engaging assembly 52F, and fitting seals 54. In particular, similar to the pipe engaging assembly 52A of FIG. 6, as depicted in FIG. 11, the pipe engaging assembly 52F generally includes a collapsible collar 64F.

However, to facilitate controlling the inner surface diameter of the collapsible collar 64F and, thus, its activation state, as depicted in FIG. 11, the pipe engaging assembly 52F of the reusable pipe fitting 44 additionally includes multiple radial threaded fasteners 94, such as bolts or screws, for example, instead of an activation collar 68. In particular, as in the depicted example, in some embodiments, a radial threaded fastener 94 may be secured through a radial fastener opening 96 in the fitting body 46 of a reusable pipe fitting 44 such that its threaded end extends into the pipe engaging assembly cavity 89 of the reusable pipe fitting 44 and abuts the outer surface of a corresponding collar segment in the collapsible collar 64 of the reusable pipe fitting 44. Accordingly, in such embodiments, tightening the radial threaded fastener 94 in the radial fastener opening 96 may cause the threaded end of the radial threaded fastener 94 to push a corresponding collar segment of the collapsible collar 64 radially inward and, thus, facilitate transitioning the pipe engaging assembly 52 toward its activated state. On the other hand, in such embodiments, loosening the radial threaded fastener 94 from the corresponding radial fastener opening 96 may cause the threaded end of the radial threaded fastener 94 to retract from the corresponding collar segment of the collapsible collar 64, thereby enabling the collar segment of the collapsible collar 64 to expand radially outward and, thus, the pipe engaging assembly 52 to transition away from its activated state, for example, to enable the reusable pipe fitting 44 to be removed from pipe segment tubing 22 and re-deployed at different pipe segment tubing 22.

Moreover, as in the depicted example, in some embodiments, a reusable pipe fitting 44 may be implemented such that its radial threaded fasteners 94 are substantially flush with the outer surface of its fitting body 46 when its pipe engaging assembly 52 is in its activated state, for example, to facilitate reducing the likelihood of an external object catching on the reusable pipe fitting 44 or vice versa. As in the depicted example, to enable a radial threaded fastener 94 to sit substantially flush, in some such embodiments, a corresponding fastener recess 97 may be defined along the outer surface of the fitting body 46 of a reusable pipe fitting 44. More specifically, as in the depicted example, a fastener recess 97 may be defined in the fitting body 46 concentrically around a corresponding radial fastener opening 96 such that the head of a radial threaded fastener 94 sits therein as it is tightened.

However, it should be appreciated that the depicted example is merely intended to be illustrative and not limiting. In particular, although an interior carcass ring 80A is depicted, in other embodiments, the reusable pipe fitting 44F may not include a carcass ring 80 or, alternatively, include an exterior carcass ring 80B. Additionally, in other embodiments, a reusable pipe fitting 44 may not include fastener recesses 97 defined along the outer surface of its fitting body 46. Furthermore, in other embodiments, a pipe engaging assembly 52 of a reusable pipe fitting 44 may include more than two (e.g., three, four, or more) radial threaded fasteners 94, for example, when its collapsible collar 64 includes more than two collar segments. In any case, in this manner, the present disclosure provides techniques for implementing and/or deploying a reusable pipe fitting 44, which, at least in some instances, may facilitate improving deployment efficiency of a pipeline system 10, for example, due to re-deployment of the reusable pipe fitting 44 enabling a reduction in the number of new pipe fittings 18 deployed therein.

Figure 12:
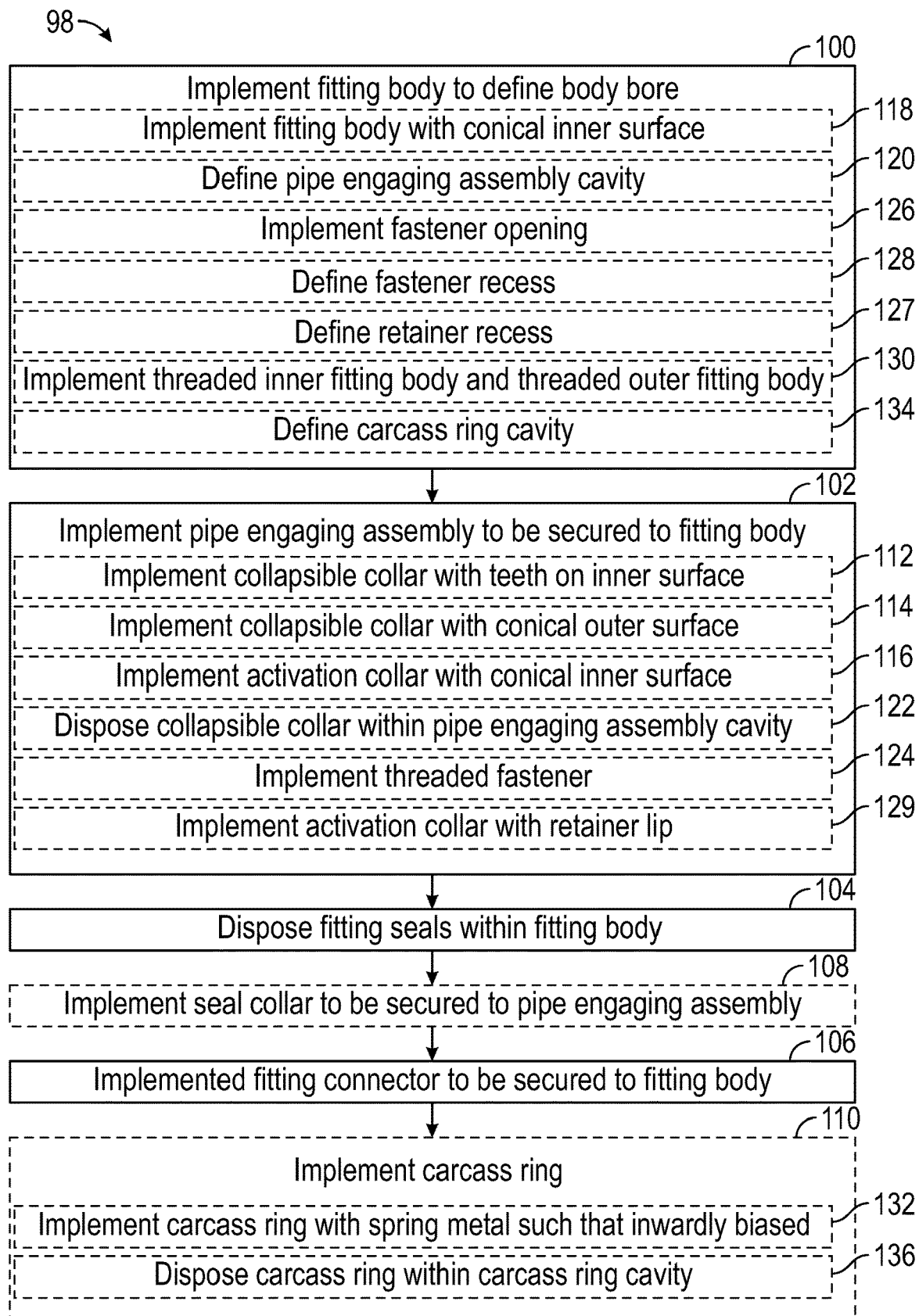
FIG. 12 is a flow diagram of an example process for implementing a reusable pipe fitting, in accordance with an embodiment of the present disclosure.

To help further illustrate, an example of a process 98 for implementing (e.g., manufacturing) a reusable pipe fitting 44 is described in FIG. 12. Generally, the process 98 includes implementing a fitting body to define a body bore (process block 100) and implementing a pipe engaging assembly to be secured to the fitting body (process block 102). Additionally, the process 98 generally includes disposing fitting seals within the fitting body (process block 104) and implementing a fitting connector to be secured to the fitting body (process block 106).

Although specific process blocks are described in a specific order, which corresponds with an embodiment of the present disclosure, it should be appreciated that the example process 98 is merely intended to be illustrative and non-limiting. In particular, in other embodiments, a process 98 for implementing a reusable pipe fitting 44 may include one or more additional blocks and/or omit one or more of the depicted blocks. For example, some embodiments of the process 98 may additionally include implementing a seal collar to be secured to the pipe engaging assembly (process block 108) while other embodiments of the process 98 do not. As another example, some embodiments of the process 98 may additionally include implementing a carcass ring (process block 110) while other embodiments of the process 98 do not. Moreover, in other embodiments, one or more of the depicted blocks may be performed in a different order, for example, such that the fitting connector is implemented before the fitting body.

In any case, as described above, a reusable pipe fitting 44 may generally include a fitting body 46. In particular, as described, the fitting body 46 of a reusable pipe fitting 44 may be implemented to define a body (e.g., fitting) bore 48 in which the tubing 22 of a pipe segment 20 is to be secured and sealed. Accordingly, implementing a reusable pipe fitting 44 may generally include implementing a fitting body 46 to define a body bore 48 (process block 100). In particular, in some embodiments, the fitting body 46 of a reusable pipe fitting 44 may be made at least in part using metal, such as carbon steel, stainless steel, duplex stainless steel, super duplex stainless steel, or any combination thereof.

In addition to a fitting body 46, as described above, a reusable pipe fitting 44 may generally include a pipe engaging assembly 52 secured to the fitting body 46. In particular, as described above, the pipe engaging assembly 52 of a reusable pipe fitting 44 may generally include a collapsible collar 64. As such, implementing a reusable pipe fitting 44 may generally include implementing a pipe engaging assembly 52, which includes a collapsible collar 64, to be secured to the fitting body 46 of the reusable pipe fitting 44 (process block 102).

As described above, the collapsible collar 64 of a pipe engaging assembly 52 in a reusable pipe fitting 44 may be selectively contracted around the tubing 22 of a pipe segment 20 such that the inner surface of the collapsible collar engages the outer surface of the pipe segment tubing 22 to secure the reusable pipe fitting 44 to the pipe segment tubing 22. In particular, as described above, in some embodiments, the pipe engaging assembly 52 may be in its activated state when an inner surface diameter of its collapsible collar 64 is less than or equal to (e.g., not greater than) a default (e.g., natural, original, and/or uncompressed) outer surface diameter of pipe segment tubing 22 secured or to be secured therein. On the other hand, the pipe engaging assembly 52 may be in a deactivated state when the inner surface diameter of its collapsible collar 64 is greater than the default outer surface diameter of the pipe segment tubing 22.

Additionally, as described above, to enable dynamically (e.g., adaptively) adjusting its inner surface diameter, the collapsible collar 64 in a pipe engaging assembly 52 may include multiple collar (e.g., "dog") segments such that open space is at least partially present between adjacent collar segments at least while the pipe engaging assembly is in a deactivated state. For example, in some embodiments, the collapsible collar 64 in a pipe engaging assembly 52 may include multiple separate collar segments. However, in other embodiments, the collapsible collar 64 in a pipe engaging assembly 52 may be implemented with a ring that has slits cut therein to partially separate adjacent collar segments.

In any case, as described above, to facilitate improving securement strength provided by a reusable pipe fitting 44, in some embodiments, the collapsible collar 64 in its pipe engaging assembly 52 may include an inner surface that includes one or more teeth (e.g., serrations) (process block 112). Additionally, as described above, to facilitate controlling the inner surface diameter of its collapsible collar 64 and, thus, its activation state, in some embodiments, a pipe engaging assembly 52 in a reusable pipe fitting 44 may include an activation collar 68, which may be disposed circumferentially around at least a portion of the collapsible collar 64. In particular, as described above, to enable the position of its activation collar 68 on its collapsible collar 64 to control its activation state, the collapsible collar 64 may have a conical outer surface 67 while the activation collar 68 may have a conical inner surface 69, which can slide again the conical outer surface 67 of the collapsible collar 64. In other words, in such embodiments, implementing a pipe engaging assembly 52 may include implementing its collapsible collar 64 with a conical outer surface 67 (process block 114) and implementing its activation collar 68 with a conical inner surface 69 (process block 116).

In fact, as described above, in some such embodiments, the collapsible collar 64 in a pipe engaging assembly 52 of a reusable pipe fitting 44 may be implemented with multiple conical outer surfaces 67. In particular, as described above, in addition to a first conical outer surface 67A that slides along a conical inner surface 69 of a corresponding activation collar 68, the collapsible collar 64 may include a second conical outer surface 67B, which is implemented to slide along a conical inner surface 88 of the fitting body 46 of the reusable pipe fitting 44. In other word, in such embodiments, implementing the fitting body 46 of a reusable pipe fitting 44 may include implementing the fitting body 46 with a conical inner surface 88 (process block 118).

In any case, as described above, in some embodiments, a pipe engaging assembly 52 of a reusable pipe fitting 44 may be disposed within a pipe engaging assembly cavity 89 defined within the fitting body 46 of the reusable pipe fitting 44. In other words, in such embodiments, implementing the fitting body 46 of the reusable pipe fitting 44 may include defining (e.g., forming) a pipe engaging assembly cavity 89, for example, such that the pipe engaging assembly cavity 89 is concentric with a body bore 48 defined by the fitting body 46 (process block 120). Additionally, in such embodiments, implementing the pipe engaging assembly 52 of a reusable pipe fitting may include disposing its collapsible collar 64 (e.g., in addition to its activation collar 68) within the pipe engaging assembly cavity 89 (process block 122).

However, at least in some instances, the fitting body 46 of a reusable pipe fitting 44 may obstruct the ability to directly manipulate the collapsible collar 64 or the activation collar 68 in the pipe engaging assembly 52 of the reusable pipe fitting 44. Thus, in some embodiments, the pipe engaging assembly 52 may additionally include an axial threaded fastener 90, which is implemented to be secured in an axial fastener opening 91A in the activation collar 68 and a corresponding axial fastener opening 91B in the fitting body 46 of the reusable pipe fitting 44, or a radial threaded fastener 94, which is implemented to extend through a radial fastener opening 96 in the fitting body such that its threaded end extends into the pipe engaging assembly cavity 89 in which the collapsible collar 64 is disposed. In other words, in such embodiments, implementing the pipe engaging assembly 52 of a reusable pipe fitting 44 may include implementing one or more axial threaded fasteners 90 or radial threaded fasteners 94 (process block 124). Additionally, in such embodiments, implementing the fitting body 46 of the reusable pipe fitting 44 may include implementing one or more axial fastener openings 91B or radial fastener openings 96 in the fitting body 46 (process block 126).

Furthermore, as described above, to enable a threaded fastener (e.g., axial threaded fastener 90 or radial threaded fastener 94) in a pipe engaging assembly 52 of a reusable pipe fitting 44 to sit flush with the outer surface of the fitting body 46 of the reusable pipe fitting 44, a fastener recess 97 may be defined along the outer surface of the fitting body 46. In other words, in such embodiments, implementing the fitting body 46 of a reusable pipe fitting 44 may include defining one or more fastener recesses 97 along its outer surface (process block 128). In particular, as described above, in such embodiments, a fastener recess 97 may be defined such that it is concentric with a corresponding fastener opening (e.g., axial fastener opening 91B or radial fastener opening 96) to enable the head of a corresponding threaded fastener (axial threaded fastener 90 or radial threaded fastener 94) to sit within the fastener recess 97 as the threaded fastener is tightened.

However, as described above, in other embodiments, an activation collar 68 may be secured to a corresponding fitting body 46 via a retainer lip (e.g., extension) 74 on the activation collar 68 and a retainer recess 72 on the fitting body 46. In particular, as described above, the retainer recess 72 may be defined along an outer surface of the fitting body 46 and the retainer lip 74 may be implemented to extend out toward the fitting body 46 and to matingly interlock with the retainer recess 72 on the fitting body 46. Thus, in such embodiments, implementing the fitting body 46 of a reusable pipe fitting 44 may include forming the fitting body 46 to define a retainer recess 72 along its outer surface (process block 127) and implementing the pipe engaging assembly 52 of the reusable pipe fitting 44 may include implementing its activation collar 68 with a retainer lip 74 (process block 129).

Furthermore, as described above, to facilitate controlling the position of an activation collar 68 on a corresponding collapsible collar 64, in some embodiments, the fitting body 46 of a reusable pipe fitting 44 may include a threaded inner fitting body 76 and a threaded outer fitting body 78. In other words, in such embodiments, implementing the fitting body 46 of a reusable pipe fitting 44 may include implementing a threaded inner fitting body 76 and a threaded outer fitting body 78 (process block 130). In particular, as described above, the threaded inner fitting body 76 may include threading disposed on its outer surface while the threaded outer fitting body 78 includes corresponding threading disposed on its inner surface. Thus, as described above, after an activation collar 68 of a pipe engaging assembly 52 is secured thereto, in such embodiments, tightening the threaded outer fitting body 78 on the threaded inner fitting body 76 may pull more of the activation collar 68 onto a corresponding collapsible collar 64 and, thus, facilitate transitioning the pipe engaging assembly 52 toward its activated state while loosening the threaded outer fitting body 78 from the threaded inner fitting body 76 may push more of the activation collar 68 off of the collapsible collar 64 and, thus, facilitate transitioning the pipe engaging assembly 52 away from its activated state.

In any case, as described above, to facilitate sealing pipe segment tubing 22 therein, a reusable pipe fitting 44 may include fitting seals 54, such as an inner fitting seal 54B that is implemented to be compressed against the internal pressure sheath layer 26 of the pipe segment tubing 22 and/or an outer fitting seal 54A that is implemented to be compressed against the outer sheath layer 28 of the pipe segment tubing 22. In particular, as described above, at least a portion of the fitting seals 54 may be disposed within the fitting body 46 of the reusable pipe fitting 44. As such, implementing a reusable pipe fitting 44 may generally include disposing fitting seals 54 within its fitting body 46 (process block 104).

However, as described above, in addition to fitting seals 54 disposed within its fitting body 46, in some embodiments, a reusable pipe fitting 44 may include an outer fitting seal 54A, which is compressed at least between the activation collar 68 of the reusable pipe fitting 44 and the outer sheath layer 28 of pipe segment tubing 22, for example, to facilitate improving sealing integrity provided by the reusable pipe fitting 44. In other words, in such embodiments, implementing a reusable pipe fitting 44 may include disposing an outer fitting seal 54A within the activation collar 68 of the reusable pipe fitting 44. In fact, to facilitate further improving sealing integrity provided by the reusable pipe fitting 44, in some such embodiments, the outer fitting seal 54A may be implemented to be compressed between the activation collar 68 of the reusable pipe fitting 44 and the outer sheath layer 28 of pipe segment tubing 22 as well as a seal collar 92 of the reusable pipe fitting 44. Thus, in such embodiments, implementing a reusable pipe fitting 44 may include implementing a seal collar 92 to be secured to its pipe engaging assembly 52 (process block 108).

In any case, as described above, to facilitate connecting a reusable pipe fitting 44 to another pipeline component (e.g., a bore fluid source 12, a bore fluid destination 14, or another pipe fitting 18), the reusable pipe fitting 44 may generally include a fitting connector (e.g., flange) 50 secured to its fitting body 46. As such, implementing a reusable pipe fitting 44 may generally include implementing a fitting connector 50 to be secured to its fitting body 46 (process block 106). In particular, in some embodiments, the fitting connector 50 of a reusable pipe fitting 44 may be metal, such as carbon steel, stainless steel, duplex stainless steel, super duplex stainless steel, or any combination thereof.

Additionally, as described above, in some embodiments, the fitting connector 50 of a reusable pipe fitting 44 may be secured to the fitting body 46 of the reusable pipe fitting 44 using hot tooling, such as welding and/or brazing. However, as described above, in other embodiments, the fitting connector 50 of a reusable pipe fitting 44 may be secured to the fitting body 46 of the reusable pipe fitting 44 via one or more threaded fasteners 66, such as a bolt or a screw. In fact, in some embodiments, a threaded fastener 66 used to secure the fitting connector 50 of a reusable pipe fitting 44 to the fitting body 46 of the reusable pipe fitting 44 may additionally be used to secure the fitting body 46 to the activation collar 68 of the reusable pipe fitting 44, thereby obviating a separate axial threaded fastener 90 in the pipe engaging assembly 52 of the reusable pipe fitting 44.

In any case, as described above, to facilitate anchoring the carcass layer 37 of pipe segment tubing 22 therein, in some embodiments, a reusable pipe fitting 44 may additionally include a carcass (e.g., insulator) ring 80. In other words, in such embodiments, implementing a reusable pipe fitting 44 may generally include implementing a carcass ring 80 (process block 110). In particular, as described above, in some such embodiments, the carcass ring 80 may be an interior carcass ring 80A, which is implemented to be secured to an inner surface of the carcass layer 37, or an exterior carcass ring 80B, which is implemented to be secured to an outer surface of the carcass layer 37.

As described above, to enable an exterior carcass ring 80B to grab onto an outer surface of pipe segment tubing 22, in some embodiments, the exterior carcass ring 80B may be spring metal, such as spring steel, such that the exterior carcass ring 80B is inwardly biased. Additionally, as described above, to facilitate anchoring the carcass layer 37 of pipe segment tubing 22 therein, in some embodiments, the carcass ring 80 of a reusable pipe fitting 44 may be disposed at least partially within a carcass ring cavity 84 such that the carcass ring 80 directly abuts the fitting body 46 of the reusable pipe fitting 44. In other words, in such embodiments, implementing the fitting body 46 of a reusable pipe fitting 44 may include implementing the fitting body 46 to define a carcass ring cavity 84 (process block 132) and implementing the carcass ring 80 of the reusable pipe fitting 44 may include disposing the carcass ring 80 within the carcass ring cavity 84 (process block 136). In this manner, a reusable pipe fitting 44 may be implemented to be re-deployable at different pipe segment tubing 22, which, at least in some instances, may facilitate improving deployment efficiency of a pipeline system 10, for example, due to re-deployment of the reusable pipe fitting 44 enabling a reduction in the number of new pipe fittings deployed in the pipeline system 10.

Figure 13:
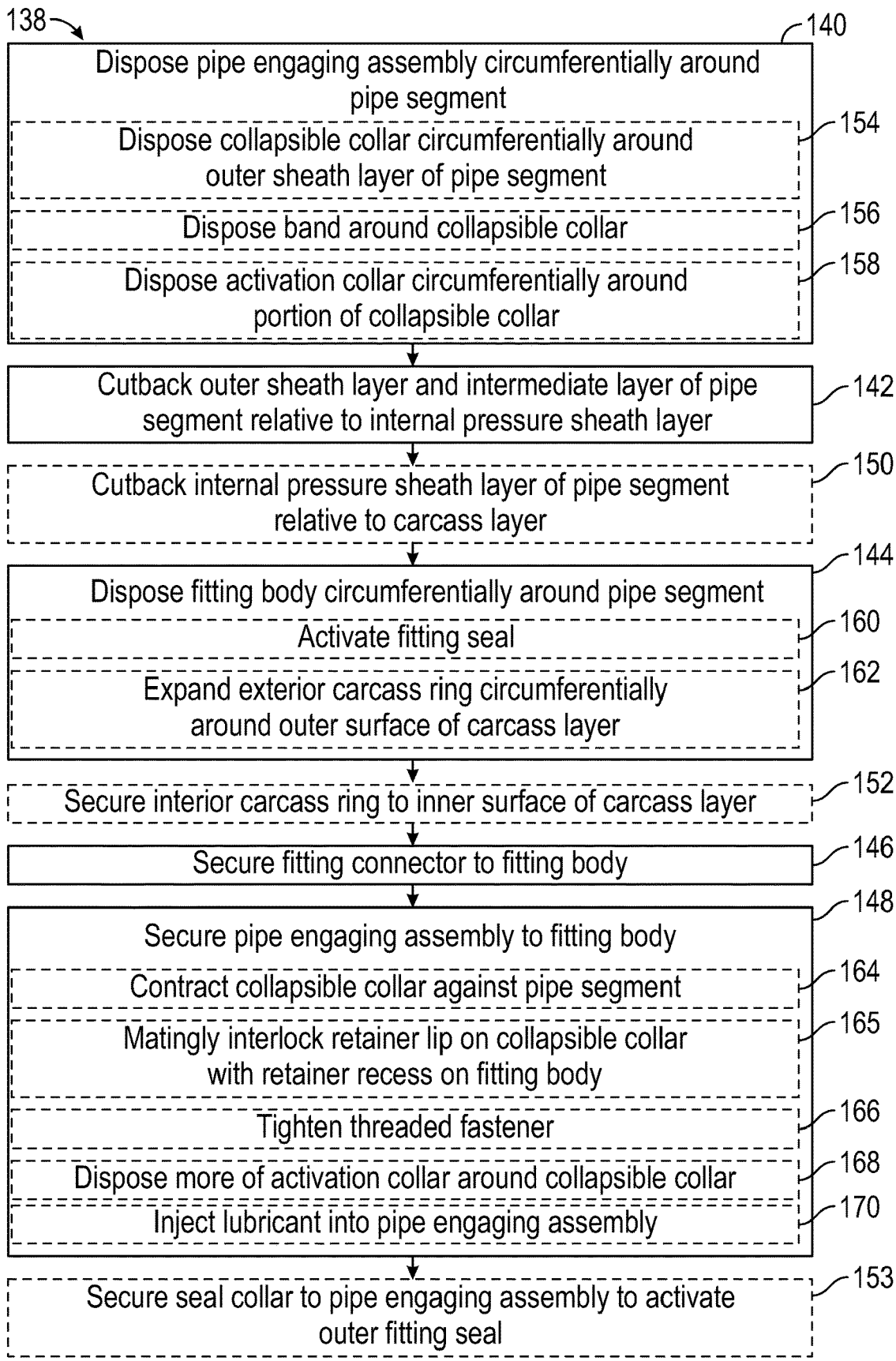
FIG. 13 is a flow diagram of an example process for deploying a reusable pipe fitting at a pipe segment, in accordance with an embodiment of the present disclosure.

To help further illustrate, an example of a process 138 for deploying a reusable pipe fitting 44 at a pipe segment 20 is described in FIG. 13. Generally, the process 138 includes disposing a pipe engaging assembly circumferentially around a pipe segment (process block 140) and cutting back an outer sheath layer and an intermediate layer of the pipe segment relative to an internal pressure sheath layer of the pipe segment (process block 142). Additionally, the process 138 generally includes disposing a fitting body circumferentially around the pipe segment (process block 144), securing a fitting connector to the fitting body (process block 146), and securing the pipe engaging assembly to the fitting body (process block 148).

Although specific process blocks are described in a specific order, which corresponds with an embodiment of the present disclosure, it should be appreciated that the example process 138 is merely intended to be illustrative and non-limiting. In particular, in other embodiments, a process 138 for deploying a reusable pipe fitting 44 at a pipe segment 20 may include one or more additional blocks and/or omit one or more of the depicted blocks. For example, some embodiments of the process 138 may additionally include cutting back the internal pressure sheath layer of the pipe segment relative to a carcass layer of the pipe segment (process block 150) while other embodiments of the process 138 do not. As another example, some embodiments of the process 138 may additionally include securing an interior carcass ring to an inner surface of the carcass layer (process block 152) while other embodiments of the process 138 do not. As a further example, some embodiments of the process 138 may additionally include securing a seal collar to the pipe engaging assembly to activate an outer fitting seal (process block 153) while other embodiments of the process 138 do not.

Moreover, in other embodiments, one or more of the depicted blocks may be performed in a different order, for example, such that the fitting connector is secured to the fitting body before the fitting body is disposed around the pipe segment.

In any case, as described above, to facilitate selectively securing the tubing 22 of a pipe segment 20 thereto, a reusable pipe fitting 44 may generally include a pipe engaging assembly 52, which is implemented and/or operated to selectively engage the outer surface of the pipe segment tubing 22. More specifically, as described above, the pipe engaging assembly 52 of a reusable pipe fitting 44 may generally include a collapsible collar 64, which is implemented to be selectively contracted around the outer sheath layer 28 of pipe segment tubing 22 such that its inner surface engages the outer sheath layer 28 of the pipe segment tubing 22. As such, deploying a reusable pipe fitting 44 at a pipe segment 20 may generally include disposing its pipe engaging assembly 52 circumferentially around the tubing 22 of the pipe segment 20 (process block 140) at least in part by disposing the collapsible collar 64 of the pipe engaging assembly 52 circumferentially around the outer sheath layer 28 of the pipe segment 20 (process block 154).

Additionally, as described above, to enable its inner surface diameter to be adaptively adjusted, the collapsible collar 64 in a pipe engaging assembly 52 may be implemented with multiple collar (e.g., "dog") segments such that open space is present between adjacent collar segments at least while the pipe engaging assembly is in a deactivated state. In fact, in some embodiments, the collapsible collar 64 may be implemented with multiple separate collar segments. Thus, to facilitate maintaining a collapsible collar 64 at a target location on a pipe segment 20 before the collapsible collar 64 is secured to the pipe segment 20, in some embodiments, disposing a pipe engaging assembly 52 around a pipe segment 20 may include disposing one or more bands 70 circumferentially around the collar segments of its collapsible collar 64 (process block 156).

Furthermore, as described above, to facilitate controlling the inner surface diameter of its collapsible collar 64 and, thus, its activation state, in some embodiments, a pipe engaging assembly 52 of a reusable pipe fitting 44 may additionally include an activation collar 68. In particular, as described above, in such embodiments, the activation collar 68 may be implemented to be disposed circumferentially around at least a portion of the collapsible collar 64. Accordingly, in such embodiments, disposing a pipe engaging assembly 52 around a pipe segment 20 may include disposing an activation collar 68 circumferentially around a portion of a collapsible collar 64, for example, at least in part by sliding the portion of the collapsible collar 64 under the activation collar and/or sliding the collapsible collar over the portion of the collapsible collar 64 (process block 158).

In any case, as described above, in addition to a pipe engaging assembly 52, a reusable pipe fitting 44 may generally include a fitting body 46. In particular, as described above, the fitting body 46 of a reusable pipe fitting 44 may generally be implemented to define a body (e.g., fitting) bore 48 in which pipe segment tubing 22 is to be disposed. Accordingly, deploying a reusable pipe fitting 44 at a pipe segment 20 may generally include disposing a fitting body 46 circumferentially around the tubing 22 of the pipe segment 20 (process block 140).

Additionally, as described above, in some embodiments, the tubing 22 of a pipe segment 20 may be implemented to define free space (e.g., one or more fluid conduits or annular gaps 24) within the tubing annulus 25 between the internal pressure sheath layer 26 and the outer sheath layer 28 of the pipe segment tubing 22. Thus, to facilitate sealing the tubing annulus 25 of a pipe segment 20 therein, a reusable pipe fitting 44 may generally include fitting seals 54, which are implemented to be compressed against the tubing 22 of the pipe segment. To facilitate compressing a fitting seal 54 against the tubing 22 of a pipe segment 20, as described above, the fitting seal 54 may be disposed within the fitting body 46 of the reusable pipe fitting 44. As such, disposing the fitting body 46 of a reusable pipe fitting 44 around a pipe segment 20 may activate a fitting seal 54 of the reusable pipe fitting 44 at least in part by compressing the fitting seal 54 between the fitting body 46 and the tubing 22 of the pipe segment 20 (process block 160).

In particular, as described above, the fitting seals 54 of a reusable pipe fitting 44 may generally include an outer fitting seal 54A, which is implemented to be compressed against the outer sheath layer 28 of pipe segment tubing 22. Thus, disposing the fitting body 46 of a reusable pipe fitting 44 around a pipe segment 20 may include activating an outer fitting seal 54A at least in part by compressing the outer fitting seal 54A between the fitting body 46 and the outer sheath layer 28 of the pipe segment 20. Additionally, as described above, the fitting seals 54 of a reusable pipe fitting 44 may generally include an inner fitting seal 54B, which is implemented to be compressed between the fitting body 46 of the reusable pipe fitting 44 and the outer surface of the internal pressure sheath layer 26 of pipe segment tubing 22. Thus, disposing the fitting body 46 of a reusable pipe fitting 44 around a pipe segment 20 may include activating an inner fitting seal 54 at least in part by compressing the inner fitting seal 54B between the fitting body 46 and the internal pressure sheath layer 26 of the pipe segment 20. To enable an inner fitting seal 54 to be compressed against the outer surface of its internal pressure sheath layer 26, as described above, in some embodiments, the outer sheath layer 28 and each intermediate layer 38 of a pipe segment 20 may be cut back relative to the internal pressure sheath layer 26 (process block 150).

Moreover, as described above, to facilitate anchoring the carcass layer 37 of a pipe segment 20 therein, in some embodiments, a reusable pipe fitting 44 may include an exterior carcass ring 80B that is disposed within a carcass ring cavity 84 defined in the fitting body 46 of the reusable pipe fitting 44. In particular, as described above, in such embodiments, the exterior carcass ring 80B may be implemented using spring metal, such as spring steel, such that the exterior carcass ring 80B is inwardly biased. Thus, in such embodiments, disposing the fitting body 46 of a reusable pipe fitting 44 circumferentially around a pipe segment 20 may result in contours on the outer surface of the carcass layer 37 of the pipe segment 20 causing the exterior carcass ring 80B to expand around and, thus, grab onto the carcass layer 37 (process block 162).

However, as described above, in other embodiments, a reusable pipe fitting 44 may include an interior carcass ring 80A instead of an exterior carcass ring 80B. In particular, as described above, in such embodiments, the interior carcass ring 80 may be implemented to be secured to the inner surface of the carcass layer 37 in pipe segment tubing 22. Thus, in such embodiments, deploying a reusable pipe fitting 44 at pipe segment tubing 22 may include securing an interior carcass ring 80B to the inner surface of the carcass layer 37 of the pipe segment tubing 22, for example, via one or more threaded fasteners 66 (process block 152).

In any case, as described above, to enable connection to another pipeline component, a reusable pipe fitting 44 may generally include a fitting connector (e.g., flange) 50 secured to its fitting body 46. As such, deploying a reusable pipe fitting 44 at a pipe segment 20 may generally include securing a fitting connector 50 to the fitting body 46 of the reusable pipe fitting 44 (process block 146). In particular, as described above, in some embodiments, a fitting connector 50 may be secured to a corresponding fitting body 46 via hot tooling, such as welding and/or brazing. However, as described above, in other embodiments, a fitting connector 50 may be secured to a corresponding fitting body 46 via one or more threaded fasteners 66, such as a bolt or a screw. In fact, in some embodiments, securing a fitting connector 50 to a fitting body 46 via one or more threaded fasteners 66 may facilitate disposing a lip 82 on an interior carcass ring 80 of the reusable pipe fitting 44 within a carcass ring cavity 84 defined between the fitting connector 50 and the fitting body 46.

Additionally, as described above, the pipe engaging assembly 52 of a reusable pipe fitting 44 may generally be secured to the fitting body 46 of the reusable pipe fitting 44 (process block 148). In fact, as described above, securing the pipe engaging assembly 52 to the fitting body 46 may contract the collapsible collar 64 of the pipe engaging assembly 52 radially inward and, thus, facilitate securing the reusable pipe fitting 44 to pipe segment tubing 22 (process block 164). In particular, as described above, in some embodiments, the activation collar 68 in a pipe engaging assembly 52 may be secured to a corresponding fitting body 46 via a retainer recess 72, which is implemented along the outer surface of the fitting body 46, and a retainer lip (e.g., extension) 74 on the activation collar 68, which is implemented to extend out toward the fitting body 46 and to matingly interlock with the retainer recess 72 on the fitting body 46. Thus, in such embodiments, securing a pipe engaging assembly 52 of a reusable pipe fitting 44 to the fitting body 46 of the reusable pipe fitting 44 may include matingly interlocking a retainer lip 74 on the activation collar 68 with a retainer recess 72 on the fitting body 46 (process block 165)

However, as described above, in other embodiments, a pipe engaging assembly 52 of a reusable pipe fitting 44 may be secured to a corresponding fitting body 46 via one or more axial threaded fasteners 90 or radial threaded fasteners 94. In particular, as described above, in such embodiments, the pipe engaging assembly 52 may be secured to the fitting body 46 at least in part by tightening an axial threaded fastener 90 or a radial threaded fastener 94 (process block 166). More specifically, as described above, in some embodiments, tightening a radial threaded fastener 94 in a radial fastener opening 96 that is formed through the fitting body 46 of a reusable pipe fitting 44 may cause the threaded end of the radial threaded fastener 94 to extend further into a corresponding pipe engaging assembly cavity 89 and push a corresponding collar segment of a collapsible collar 64 radially inward.

However, as described above, in other embodiments, tightening an axial threaded fastener 90 secured at least in an axial fastener opening 91A in the activation collar 68 of a pipe engaging assembly 52 and a corresponding axial fastener opening 91B in the fitting body 46 of a reusable pipe fitting 44 may pull the activation collar 68 and the fitting body 46 toward one another, thereby causing the activation collar 68 and/or the fitting body 46 to cover more of the collapsible collar 64 in the pipe engaging assembly 52=. Alternatively, as described above, in other embodiments, more of an activation collar 68 may be moved onto a corresponding collapsible collar 64 at least in part by threading the activation collar 68 directly onto a corresponding threaded fitting body 46 or securing the activation collar 68 to a threaded outer fitting body 78 and tightening the threaded outer fitting body 78 on a corresponding threaded inner fitting body 76. In any case, due at least to the conical inner surface 69 of an activation collar 68 and the conical outer surface 67 of a corresponding activation collar 68, disposing more of the activation collar 68 on the collapsible collar 64 may facilitate contracting the collapsible collar 64 radially inward (process block 168).

Furthermore, since a pipe engaging assembly 52 in a reusable pipe fitting 44 moves to transition between its activated state and its deactivated state, in some embodiments, lubricant may be injected into the pipe engaging assembly 52 when it is to be secured to a corresponding fitting body 46 (process block 170). In particular, as described above, in some such embodiments, lubricant may be injected into the pipe engaging assembly 52 via a fluid port 60 that is fluidly connected to the pipe engaging assembly 52 via a fluid path 62 defined in the fitting body 46 of the reusable pipe fitting 44. Additionally, in some such embodiments, the lubricant injected into the pipe engaging assembly 52 may include oil and/or grease.

Moreover, as described above, to facilitate improving sealing integrity, in some embodiments, a reusable pipe fitting 44 may additionally include a seal collar 92. In particular, as described above, in such embodiments, the seal collar 92 may be implemented to be secured to the activation collar 68 in the pipe engaging assembly 52 of the reusable pipe fitting 44 to facilitate activating an outer fitting seal 54A at least in part by actively compressing the outer fitting seal 54A between the seal collar 92, the activation collar 68, and the outer sheath layer 28 of pipe segment tubing 22. In other words, in such embodiments, deploying a reusable pipe fitting 44 at a pipe segment 20 may include securing a seal collar 92 to the pipe engaging assembly 52 of the reusable pipe fitting 44 to actively activate an outer fitting seal 54A of the reusable pipe fitting 44, which, at least in some instances, may facilitate improving sealing integrity provided by the reusable pipe fitting 44 (process block 153).

In this manner, the present disclosure provides techniques for deploying a reusable pipe fitting 44 at a pipe segment 20. In particular, as described above, a reusable pipe fitting 44 implemented in accordance with the present disclosure may be reversibly secured to the tubing 22 of a pipe segment 20. Thus, to facilitate improving deployment efficiency of a pipeline system 10, at least in some instances, a reusable pipe fitting 44 may be subsequently re-deployed at a different pipe segment 20, for example, due to a change in configuration of the pipeline system 10.

Figure 14:
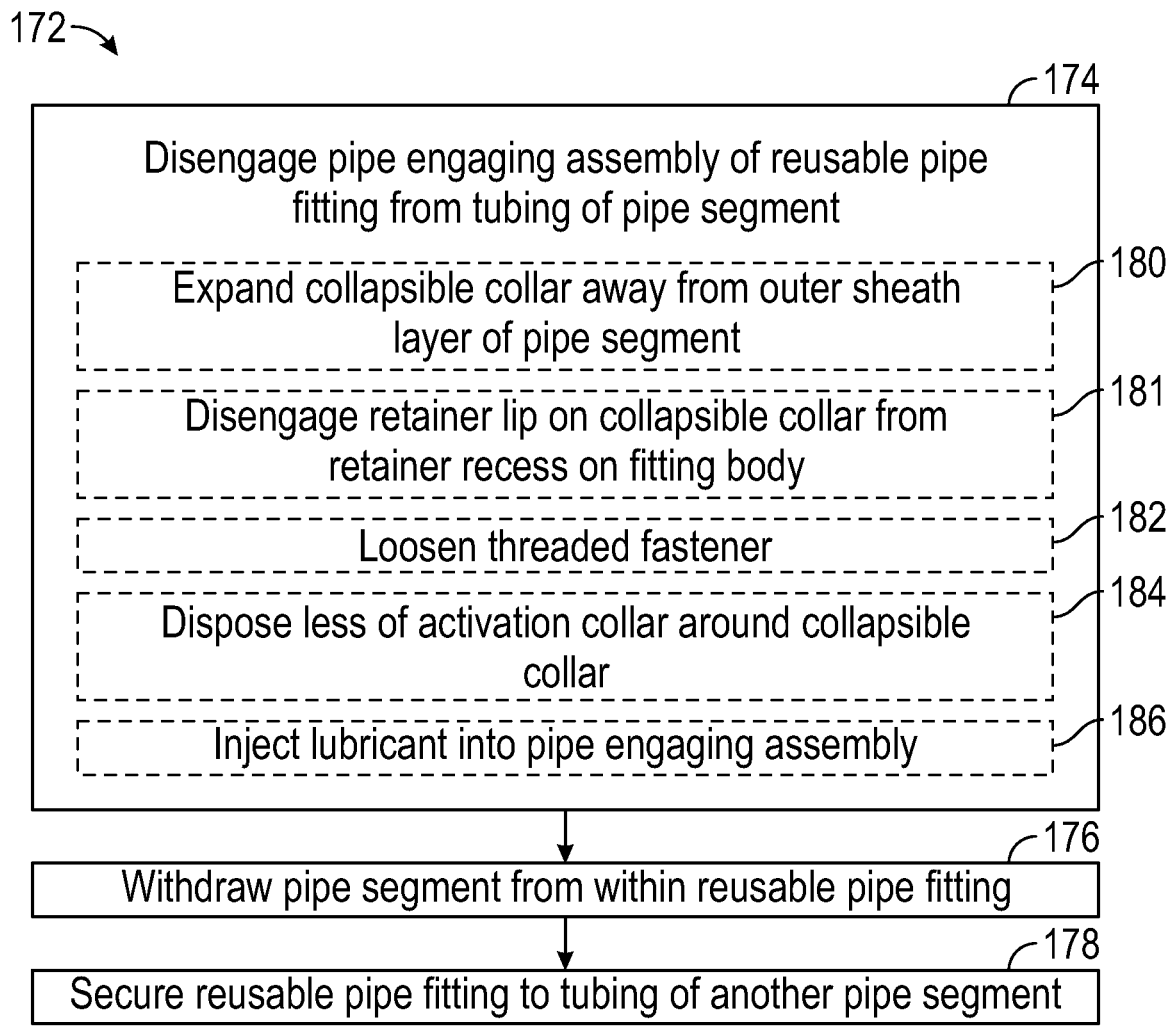
FIG. 14 is a flow diagram of an example process for re-deploying a reusable pipe fitting, in accordance with an embodiment of the present disclosure.

To help illustrate, an example of a process 172 for re-deploying a reusable pipe fitting 44 is described in FIG. 14. Generally, the process 172 includes disengaging a pipe engaging assembly of a reusable pipe fitting from tubing of a pipe segment (process block 174). Additionally, the process 172 generally includes withdrawing the pipe segment from within the reusable pipe fitting (process block 176) and securing the reusable pipe fitting to tubing of another pipe segment (process block 178).

Although specific process blocks are described in a specific order, which corresponds with an embodiment of the present disclosure, it should be appreciated that the example process 172 is merely intended to be illustrative and non-limiting. In particular, in other embodiments, a process 172 for re-deploying a reusable pipe fitting 44 may include one or more additional blocks. Additionally or alternatively, in other embodiments, a process 172 for re-deploying a reusable pipe fitting 44 at a pipe segment 20 may omit one or more of the depicted blocks.

In any case, as described above, the pipe engaging assembly 52 of a reusable pipe fitting 44 may generally engage the tubing 22 of a pipe segment 20 to facilitate securing the reusable pipe fitting 44 to the pipe segment tubing 22. More specifically, as described above, the pipe engaging assembly 52 of a reusable pipe fitting 44 may generally include a collapsible collar 64, which can be selectively contracted around the outer sheath layer 28 of pipe segment tubing 22 to facilitate securing the reusable pipe fitting 44 to the pipe segment tubing 22 and selectively expanded to facilitate releasing the pipe segment tubing 22 from the reusable pipe fitting 44. As such, re-deploying a reusable pipe fitting 44 may generally include disengaging the pipe engaging assembly 52 of the reusable pipe fitting 44 from the tubing 22 of a pipe segment 20 (process block 174) at least in part by expanding the collapsible collar 64 of the pipe engaging assembly 52 away from the outer sheath layer 28 of the pipe segment tubing 22 (process block 180).

Additionally, as described above, the pipe engaging assembly 52 of a reusable pipe fitting 44 may be transitioned to its activated state at least in part by securing the pipe engaging assembly 52 to the fitting body 46 of the reusable pipe fitting 44. As such, the pipe engaging assembly 52 may be transitioned away from its activated state at least in part by un-securing the pipe engaging assembly 52 from the fitting body 46. In particular, as described above, in some embodiments, the activation collar 68 of a pipe engaging assembly 52 may be secured to a corresponding fitting body 46 at least in part by matingly interlocking a retainer lip 74 on the activation collar with a retainer recess 72 on the outer surface of the fitting body 46. Thus, in such embodiments, disengaging a pipe engaging assembly 52 of a reusable pipe fitting 44 from the tubing 22 of a pipe segment 20 may include disengaging a retainer lip 74 on its activation collar 68 from a retainer recess 72 on a corresponding fitting body 46 (process block 181).

However, as described above, in other embodiments, a pipe engaging assembly 52 may be secured to a corresponding fitting body 46 at least in part by tightening an axial threaded fastener 90 or a radial threaded fastener 94. Thus, in such embodiments, the pipe engaging assembly 52 may be disengaged from the tubing 22 of a pipe segment 20 at least in part by loosening the axial threaded fastener 90 or the radial threaded fastener 94 (process block 182). In particular, as described above, in some such embodiments, loosening a radial threaded fastener 94 from a corresponding radial fastener opening 96 formed through the fitting body 46 of a reusable pipe fitting 44 may cause the threaded end of the radial threaded fastener 94 to retract out from a corresponding pipe engaging assembly cavity 89, thereby enabling a corresponding collar segment of a collapsible collar 64 to expand radially outward.

Moreover, as described above, in other embodiments, loosening an axial threaded fastener 90 from at least an axial fastener opening 91A in the activation collar 68 of a pipe engaging assembly 52 and a corresponding axial fastener opening 91 in the fitting body 46 of a reusable pipe fitting 44 may push the activation collar 68 and the fitting body 46 away from one another, thereby causing the activation collar 68 and/or the fitting body 46 to cover less of the collapsible collar 64 in pipe engaging assembly 52. Alternatively, as described above, in other embodiments, more of an activation collar 68 may be moved off of a corresponding collapsible collar 64 at least in part by unthreading the activation collar 68 from a corresponding threaded fitting body 46 or loosening a threaded outer fitting body 78 to which the activation collar 68 is secured from a corresponding threaded inner fitting body 76. In any case, due at least to the conical inner surface 69 of an activation collar 68 and the conical outer surface 67 of a corresponding activation collar 68, disposing less of the activation collar 68 on the collapsible collar 64 may enable the collapsible collar 64 to expand radially outward (process block 184)

Furthermore, since a pipe engaging assembly 52 in a reusable pipe fitting 44 moves to transition between its activated state and its deactivated state, in some embodiments, lubricant may be injected into the pipe engaging assembly 52 when it is to be disengaged from the tubing 22 of a pipe segment 20 (process block 186). In particular, as described above, in some such embodiments, lubricant may be injected into the pipe engaging assembly 52 via a fluid port 60 that is fluidly connected to the pipe engaging assembly 52 via a fluid path 62 defined in the fitting body 46 of the reusable pipe fitting 44. Additionally, in some such embodiments, the lubricant injected into the pipe engaging assembly 52 may include oil and/or grease.

In any case, after the pipe engaging assembly 52 of a reusable pipe fitting 44 is disengaged from the tubing 22 of a pipe segment 20 and, thus, is in its deactivated state, the pipe segment tubing 22 may be withdrawn from the body bore 48 of the reusable pipe fitting 44 (process block 176). The reusable pipe fitting 44 may then be re-deployed at the tubing 22 of another (e.g., different) pipe segment 20, for example, in accordance with the process 138 of FIG. 13. In this manner, the present disclosure provides techniques for implementing and/or deploying a reusable pipe fitting, which, at least in some instances, may facilitate improving deployment efficiency of a pipeline system, for example, due to re-deployment of the reusable pipe fitting enabling a reduction in the number of new pipe fittings deployed therein.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:
1. A method of deploying a pipe fitting in a pipeline system, comprising:
 disposing a pipe engaging assembly of the pipe fitting circumferentially around pipe segment tubing, wherein the pipe engaging assembly comprises a collapsible collar;
 disposing the pipe segment tubing within a body bore defined in a fitting body of the pipe fitting such that a fitting seal disposed within the fitting body is compressed directly between the fitting body and the pipe segment tubing to facilitate sealing the pipe segment tubing within the pipe fitting;
 contracting the collapsible collar of the pipe engaging assembly radially inward to facilitate securing the pipe fitting to the pipe segment tubing at least in part by securing the pipe engaging assembly to the fitting body of the pipe fitting;
 securing a carcass ring to a carcass layer of the pipe segment tubing, wherein the carcass layer is a metal interlocked layer that is an innermost layer of the pipe segment tubing; and disposing the carcass ring at least partially within a carcass ring cavity defined in the pipe fitting to facilitate anchoring the carcass layer of the pipe segment tubing in the pipe fitting.

2. The method of claim 1, comprising:
expanding the collapsible collar of the pipe engaging assembly radially outward such that the collapsible collar disengages from the pipe segment tubing at least in part by unsecuring the pipe engaging assembly from the fitting body of the pipe fitting;
withdrawing the pipe segment tubing from the body bore of the pipe fitting;
disposing the pipe engaging assembly of the pipe fitting circumferentially around other pipe segment tubing in the pipeline system;
disposing the other pipe segment tubing within the body bore of the pipe fitting such that the fitting seal is compressed directly between the fitting body and the other pipe segment tubing to facilitate sealing the other pipe segment tubing within the pipe fitting; and
contracting the collapsible collar of the pipe engaging assembly radially inward to facilitate securing the pipe fitting to the other pipe segment tubing at least in part by re-securing the pipe engaging assembly to the fitting body of the pipe fitting.

3. The method of claim 2, wherein:
contracting the collapsible collar of the pipe engaging assembly radially inward comprises disposing more of an activation collar in the pipe engaging assembly on the collapsible collar; and
expanding the collapsible collar radially outward comprises disposing less of the activation collar on the collapsible collar.

4. The method of claim 2, wherein:
contracting the collapsible collar of the pipe engaging assembly radially inward comprises tightening a radial threaded fastener in a radial fastener opening formed through the fitting body of the pipe fitting such that a threaded end of the radial threaded fastener pushes a corresponding collar section of the collapsible collar radially inward; and
expanding the collapsible collar of the pipe engaging assembly radially outward comprises loosening the radial threaded fastener from the radial fastener opening such that the threaded end of the radial fastener opening moves away from the corresponding collar section of the collapsible collar to enable the corresponding collar section to expand radially outward.

5. The method of claim 1, wherein:
disposing the pipe segment tubing within the body bore defined in the fitting body of the pipe fitting comprises:
compressing the fitting seal disposed within the fitting body directly between the fitting body and an internal pressure sheath layer of the pipe segment tubing; and
compressing a first outer fitting seal disposed within the fitting body directly between the fitting body and an outer pressure sheath layer of the pipe segment tubing; and
contracting the collapsible collar of the pipe engaging assembly radially inward comprises sliding more of an activation collar in the pipe engaging assembly onto the collapsible collar such that a second outer fitting seal disposed within the activation collar is compressed directly between the activation collar and the outer pressure sheath layer of the pipe segment tubing.

6. A pipe fitting comprising:
a fitting body configured to define a body bore in which pipe segment tubing is to be secured and sealed;
a fitting connector configured to be secured to the fitting body to enable the pipe fitting to be connected to another pipeline component;
a pipe engaging assembly configured to be secured to the fitting body, wherein the pipe engaging assembly comprises:
a collapsible collar having a conical outer surface, wherein the collapsible collar is configured to be disposed circumferentially around the pipe segment tubing; and
an activation collar having a conical inner surface that is configured to slide along the conical outer surface of the collapsible collar to enable the pipe fitting to be selectively secured to the pipe segment tubing at least in part by controlling position of the activation collar on the collapsible collar;
an inner fitting seal disposed within the fitting body, wherein the inner fitting seal is configured to be compressed directly between the fitting body and an internal pressure sheath layer of the pipe segment tubing to facilitate sealing the pipe segment tubing within the pipe fitting;
a first outer fitting seal disposed within the fitting body, wherein the first outer fitting seal is configured to be compressed directly between the fitting body and an outer sheath layer of the pipe segment tubing; and
a second outer fitting seal disposed within the activation collar of the pipe engaging assembly, wherein the second outer fitting seal is configured to be compressed at least between the activation collar and the outer sheath layer of the pipe segment tubing.

7. The pipe fitting of claim 6, comprising a carcass ring, wherein the carcass ring is configured to be:
secured to a carcass layer of the pipe segment tubing, wherein the carcass layer is a metal interlocked layer that is an innermost layer of the pipe segment tubing; and
disposed at least partially within a carcass ring cavity defined in the pipe fitting to facilitate anchoring the carcass layer of the pipe segment tubing in the pipe fitting.

8. A pipe fitting comprising:
a fitting body configured to define a body bore in which pipe segment tubing is to be secured and sealed;
a fitting connector configured to be secured to the fitting body to enable the pipe fitting to be connected to another pipeline component;
a pipe engaging assembly configured to be secured to the fitting body, wherein the pipe engaging assembly comprises:
a collapsible collar having a conical outer surface, wherein the collapsible collar is configured to be disposed circumferentially around the pipe segment tubing; and
an activation collar having a conical inner surface that is configured to slide along the conical outer surface of the collapsible collar to enable the pipe fitting to be selectively secured to the pipe segment tubing at least in part by controlling position of the activation collar on the collapsible collar;
a fitting seal disposed within the fitting body, wherein the fitting seal is configured to be compressed directly between the fitting body and the pipe segment tubing to facilitate sealing the pipe segment tubing within the pipe fitting; and a carcass ring, wherein the carcass ring is configured to be:
  secured to a carcass layer of the pipe segment tubing, wherein the carcass layer is a metal interlocked layer that is an innermost layer of the pipe segment tubing; and
  disposed at least partially within a carcass ring cavity defined in the pipe fitting to facilitate anchoring the carcass layer of the pipe segment tubing in the pipe fitting.

* * * * *